United States Patent
Kume et al.

(10) Patent No.: US 7,253,872 B2
(45) Date of Patent: Aug. 7, 2007

(54) LIQUID CRYSTAL DISPLAY APPARATUS COMPRISING WALL PORTIONS FORMED IN A PLURALITY OF OPENINGS OR CUT-OUT PORTIONS OF AN ELECTRODE

(75) Inventors: Yasuhiro Kume, Osaka (JP); Nobukazu Nagae, Nara (JP); Kazuhiko Tamai, Mie (JP); Noriaki Onishi, Nara (JP); Takaaki Okamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 10/952,480

(22) Filed: Sep. 29, 2004

(65) Prior Publication Data
US 2005/0068482 A1   Mar. 31, 2005

(30) Foreign Application Priority Data

| Sep. 29, 2003 | (JP) | ............................ 2003-337993 |
| Sep. 29, 2003 | (JP) | ............................ 2003-337994 |
| Sep. 17, 2004 | (JP) | ............................ 2004-271827 |

(51) Int. Cl.
*G02F 1/1337* (2006.01)

(52) U.S. Cl. ....................... 349/191; 349/156; 349/130; 349/129

(58) Field of Classification Search ................ 349/130, 349/156, 117, 114, 123, 129, 191, 96, 138, 349/178
See application file for complete search history.

(56) References Cited

U.S. PATENT DOCUMENTS

| 5,666,179 | A |  | 9/1997 | Koma |
| 6,195,140 | B1 |  | 2/2001 | Kubo et al. |
| 6,256,080 | B1 | * | 7/2001 | Colgan et al. ............... 349/129 |
| 6,330,049 | B1 |  | 12/2001 | Kume et al. |
| 6,335,780 | B1 | * | 1/2002 | Kurihara et al. ............ 349/156 |
| 6,339,460 | B1 | * | 1/2002 | Saitoh ........................ 349/117 |
| 6,384,889 | B1 |  | 5/2002 | Miyachi et al. |
| 6,452,654 | B2 |  | 9/2002 | Kubo et al. |
| 6,753,939 | B2 |  | 6/2004 | Jisaki et al. |
| 6,788,375 | B2 |  | 9/2004 | Ogishima et al. |
| 2002/0036740 | A1 |  | 3/2002 | Kubo et al. |
| 2002/0075436 | A1 | * | 6/2002 | Kubo et al. ................. 349/129 |
| 2002/0145698 | A1 |  | 10/2002 | Imai et al. |
| 2002/0149728 | A1 |  | 10/2002 | Ogishima et al. |
| 2003/0076464 | A1 |  | 4/2003 | Ozawa et al. |
| 2003/0107695 | A1 |  | 6/2003 | Kubo et al. |

FOREIGN PATENT DOCUMENTS

| JP | 2003-140174 | 5/2003 |
| JP | 2003-262857 | 9/2003 |
| JP | 2003-315803 | 11/2003 |

* cited by examiner

*Primary Examiner*—Thoi V. Duong
(74) *Attorney, Agent, or Firm*—Nixon & Vanderhye P.C.

(57) ABSTRACT

A liquid crystal display apparatus includes a first substrate; a second substrate provided so as to face the first substrate; a vertical alignment type liquid crystal layer provided between the first substrate and the second substrate; a plurality of pixel areas each including a first electrode provided on the first substrate, a second electrode provided on the second substrate, and the liquid crystal layer provided between the first electrode and the second electrode; and a wall structure regularly arranged on a surface of the first electrode closer to the liquid crystal layer. The liquid crystal layer, when being provided with at least a prescribed voltage, forms at least one liquid crystal domain exhibiting a radially inclined orientation in an area substantially surrounded by the wall structure.

19 Claims, 17 Drawing Sheets

Transmissive Area A — Reflective Area B

Transmissive Area A — Reflective Area B

When No Voltage Is Applied

When A Voltage Is Applied

LIQUID CRYSTAL DISPLAY APPARATUS COMPRISING WALL PORTIONS FORMED IN A PLURALITY OF OPENINGS OR CUT-OUT PORTIONS OF AN ELECTRODE

BACKGROUND OF THE INVENTION

1. Field of the Invention

The present invention relates to a liquid crystal display apparatus, and in particular to a liquid crystal display apparatus preferably used for mobile information terminals (for example, PDAs), cellular phones, vehicle-mountable liquid crystal display apparatuses, digital cameras, personal computers, amusement devices, TVs and the like.

2. Description of the Related Art

Recently, liquid crystal display apparatuses are widely used, owing to their features of being thin and low in power consumption, for information devices such as notebook personal computers, cellular phones, electronic personal organizers and the like, and also for camera-integrated VTRs having a liquid crystal monitor.

As a display mode for realizing a high contrast and a wide viewing angle, a vertical orientation mode using a vertical orientation type liquid crystal layer has attracted attention. A vertical orientation type liquid crystal layer is generally formed using a vertical alignment layer and a liquid crystal material having a negative dielectric anisotropy.

For example, Japanese Laid-Open Patent Publication No. 6-301036discloses a liquid crystal display apparatus having improved viewing angle characteristics. This is realized by generating an inclined electric field around openings provided in a counter electrode, which faces pixel electrodes with a liquid crystal layer interposed therebetween, and orienting liquid crystal molecules in an inclined manner around liquid crystal molecules which are in a vertically oriented state in the opening.

However, the structure disclosed in Japanese Laid-Open Patent Publication No. 6-301036 has the following problem. It is difficult to generate an inclined electric field in the entire area in the pixels. As a result, response of the liquid crystal molecules to a voltage application is delayed in some of the areas in the pixels, which causes an after image phenomenon.

In order to solve this problem, Japanese Laid-Open Patent Publication No. 2000-47217 discloses a liquid crystal display apparatus having a plurality of liquid crystal domains exhibiting a radially inclined orientation in pixels. This is realized by regularly arranging openings in pixel electrodes or a counter electrode.

Japanese Laid-Open Patent Publication No. 2003-167253 discloses a technology of regularly arranging a plurality of convexed portions in pixels, and thus stabilizing the orientation state of liquid crystal domains exhibiting a radially inclined orientation which appears around the convexed portions. This publication discloses that display characteristics can be improved by regulating the orientation of liquid crystal molecules using an inclined electric field caused by the openings provided in electrodes as well as by the regulating force provided by the convexed portions.

Recently, a liquid crystal display apparatus capable of high quality display both indoor and outdoor has been proposed (see, for example, Japanese Patent No. 2955277 and U.S. Pat. No. 6,195,140). Such a liquid crystal display apparatus, which is referred to as a transflective liquid crystal display apparatus, includes a reflective area and a transmissive area in a pixel. In the reflective area, images are displayed in a reflective mode, and in the transmissive area, images are displayed in a transmissive mode.

Currently commercially available transflective liquid crystal display apparatuses use an ECB mode or a TN mode, for example. Japanese Laid-Open Patent Publication No. 2003-167253 discloses a structure by which the vertical orientation mode is applied to a transflective liquid crystal display apparatus in addition to a structure by which the vertical orientation mode is applied to a transmissive liquid crystal display apparatus. Japanese Laid-Open Publication No. 2002-350853 discloses a technology for controlling the orientation of liquid crystal molecules (polyaxial orientation) in a transflective liquid crystal display apparatus including a vertical orientation type liquid crystal layer. The orientation is controlled by a convexed portion formed in an insulating layer, which is provided in order to make the thickness of the liquid crystal layer in the transmissive area twice as great as the thickness of the liquid crystal layer in the reflective area. The convex portion has the shape of, for example, a regular octagon. In the structure disclosed in this publication, a projection (concaved portion) or a slit (electrode opening) is formed at a position facing the convexed portion with the liquid crystal layer interposed therebetween. (See, for example, Japanese Laid-Open Publication No. 2002-350853, FIGS. 4 and 16).

Japanese Laid-Open Publications Nos. 2003-167253 and 2003-315083 describe a technology for realizing a radially inclined orientation of liquid crystal molecules in liquid crystal domains by forming convexed portions on a surface of a substrate closer to the side of the liquid crystal layer. It is also described that the radially inclined orientation is stabilized in the state where a voltage is applied, by the effect provided by the convexed portions formed on the substrate and by the orientation regulating structure provided in the other substrate.

According to the technology disclosed by Japanese Laid-Open Publications Nos. 2000-47217 and 2003-167253, convexed portions or openings are provided in pixels to form a plurality of liquid crystal domains (i.e., to divide each pixel into a plurality of areas), so that the orientation regulating force on the liquid crystal molecules is strengthened. A study performed by the present inventor has found that in order to obtain a sufficient orientation regulating force, it is necessary to form an orientation regulating structure such as convexed portions, openings or the like on both sides of the liquid crystal layer (i.e., regions which are on surfaces of a pair of substrates facing each other, the surfaces being closer to the liquid crystal layer). Such a structure complicates the production process. An orientation regulating structure provided in the pixels may reduce the effective numerical aperture of the pixels, or reduce the contrast ratio due to light leakage from an area around the convexed portions in the pixels. In the case where the orientation regulating structure is provided on both sides of the liquid crystal layer, the reduction in the effective numerical aperture and/or the reduction in the contrast ratio is more conspicuous because of the influence of the alignment margin of the substrates.

With the technology disclosed by Japanese Laid-Open Patent Publication No. 2002-350853, it is necessary to provide convexed portions or electrode openings on the opposite side to the concaved portions, which are provided for controlling the polyaxial orientation. This causes the same problems as described above.

With the technology disclosed by Japanese Laid-Open Patent Publication No. 2000-47217, 2003-167253, 2002-350853 or 2003-315803, there are the following problems even when the orientation regulating structure is provided in both of the substrates: response to gray scale display is slow; and/or it takes a long time until an after image, generated when a panel surface is pressed, disappears. It is difficult to use such technology for mobile-use liquid crystal display apparatuses.

The present invention, for solving the above-described problems, has an objective of providing a liquid crystal display apparatus having a plurality of radially inclined orientation domains in a pixel, which sufficiently stabilizes the orientation of liquid crystal molecules and thus realizes display quality equivalent to, or higher than, the display quality provided by the conventional apparatuses, with a relatively simple structure of having an orientation regulating structure for a radially inclined orientation in only one substrate.

Another objective of the present invention is to provide a liquid crystal display apparatus which further stabilizes the orientation of the liquid crystal molecules, and realizes a faster response in gray scale display or requires a shorter time until an after image, generated when the panel surface is pressed, disappears.

SUMMARY OF THE INVENTION

According to a first aspect of the present invention, a liquid crystal display apparatus includes a first substrate; a second substrate provided so as to face the first substrate; a vertical alignment type liquid crystal layer provided between the first substrate and the second substrate; a plurality of pixel areas each including a first electrode provided on the first substrate, a second electrode provided on the second substrate, and the liquid crystal layer provided between the first electrode and the second electrode; and a wall structure regularly arranged on a surface of the first electrode closer to the liquid crystal layer. The liquid crystal layer, when being provided with at least a prescribed voltage, forms at least one liquid crystal domain exhibiting a radially inclined orientation in an area substantially surrounded by the wall structure.

In one embodiment of the invention, the first electrode has a plurality of openings or cut-out portions at prescribed positions, and the wall structure includes a first wall portion formed in the plurality of openings or cut-out portions.

In one embodiment of the invention, the plurality of openings or cut-out portions each include a rectangular portion, and the wall structure includes the first wall portion provided parallel to the rectangular portion.

In one embodiment of the invention, the plurality of openings or cut-out portions each include a rectangular portion, and the wall structure includes a second wall portion extended from the first wall portion.

In one embodiment of the invention, a width WW of the first wall portion fulfills the relationship of 0.4 EW<WW<0.8 EW with respect to a width EW of the opening or the cut-out portion in which the first wall portion is provided.

In one embodiment of the invention, the first electrode includes a transparent electrode for defining a transmissive area, and a width EW of the opening or the cut-out portion fulfills the relationship of 1.8 dt<EW<2.5 dt with respect to a thickness dt of the liquid crystal layer in the transmissive area.

In one embodiment of the invention, the wall structure includes a third wall portion provided in an area surrounding the first electrode.

In one embodiment of the invention, the liquid crystal display apparatus further includes a dielectric structure provided on a surface of the second substrate closer to the liquid crystal layer.

In one embodiment of the invention, the dielectric structure is located at substantially the center of the at least one liquid crystal domain.

In one embodiment of the invention, the dielectric structure is located at substantially the center of an area substantially surrounded by the wall structure.

In one embodiment of the invention, where a planar size of the area substantially surrounded by the wall structure is Sd, a planar size of a bottom of the dielectric structure located at substantially the center of the area is Sb, and Sa=(Sb/Sd)×100, the relationship of $2 \leq Sa \leq 25$ is fulfilled.

In one embodiment of the invention, at least a portion of the wall structure and the dielectric structure is located in a light shielding area.

In one embodiment of the invention, the liquid crystal layer includes a plurality of areas having different thicknesses.

In one embodiment of the invention, the first electrode includes a transparent electrode for defining a transmissive area and a reflective electrode for defining a reflective area, and a thickness dt of the liquid crystal layer in the transmissive area is larger than a thickness dr of the liquid crystal layer in the reflective area.

In one embodiment of the invention, the openings or the cut-out portions include an opening or a cut-out portion provided between the transmissive area and the reflective area.

In one embodiment of the invention, a height WH of the wall structure fulfills the relationship of 0.25 dt<WH<0.4 dt with respect to the thickness dt of the liquid crystal layer in the transmissive area.

In one embodiment of the invention, at least one of the first substrate and the second substrate has a support for defining the thickness of the liquid crystal layer.

In one embodiment of the invention, the first substrate further includes an active element provided for each of the plurality of pixel areas, and the first electrode is a pixel electrode provided for each of the plurality of pixel areas and connected to the active element.

In one embodiment of the invention, the liquid crystal display apparatus further includes a pair of polarizing plates provided so as to face each other with the first substrate and the second substrate interposed therebetween, and at least one biaxial optically anisotropic medium layer provided between the first substrate and/or the second substrate and the pair of polarizing plates.

In one embodiment of the invention, the liquid crystal display apparatus further includes a pair of polarizing plates provided so as to face each other with the first substrate and the second substrate interposed therebetween, and at least one uniaxial optically anisotropic medium layer provided between the first substrate and/or the second substrate and the pair of polarizing plates.

According to the second aspect of the present invention, a liquid crystal display apparatus includes a first substrate; a second substrate provided so as to face the first substrate; a vertical alignment type liquid crystal layer provided between the first substrate and the second substrate; and a plurality of pixel areas each including a first electrode provided on the first substrate, a second electrode provided on the second substrate, and the liquid crystal layer provided between the first electrode and the second electrode. The first electrode includes at least two openings and at least one cut-out portion provided at prescribed positions. The liquid crystal layer, when being provided with at least a prescribed voltage, forms at least two liquid crystal domains each exhibiting a radially inclined orientation, and a central axis of the radially inclined orientation of each of the at least two liquid crystal domains is formed in the at least two openings or in the vicinity thereof.

In one embodiment of the invention, the liquid crystal display apparatus further includes a light shielding area between the plurality of pixel areas, and a wall structure regularly arranged on a surface of the first substrate closer to the liquid crystal layer in the light shielding area.

In one embodiment of the invention, the liquid crystal display apparatus further includes a light shielding area between the plurality of pixel areas, and a support provided in the light shielding area for defining the thickness of the liquid crystal layer.

In one embodiment of the invention, the first electrode includes a transparent electrode for defining a transmissive area and a reflective electrode for defining a reflective area, and a thickness dt of the liquid crystal layer in the transmissive area and a thickness dr of the liquid crystal layer in the reflective area fulfill the relationship of 0.3 dt<dr<0.7 dt.

In one embodiment of the invention, at least one liquid crystal domain of the at least two liquid crystal domains is formed in the transmissive area, and the at least one cut-out portion includes a plurality of cut-out portions arranged in a point symmetrical manner around an opening corresponding to the central axis of the at least one liquid crystal domain formed in the transmissive area.

In one embodiment of the invention, a transparent dielectric layer is selectively provided in the reflective area of the second substrate.

In one embodiment of the invention, the transparent dielectric layer has a function of scattering light.

In one embodiment of the invention, the liquid crystal display apparatus further includes a color filter layer provided on the second substrate, wherein an optical concentration of the color filter layer in the reflective area is smaller than the optical concentration of the color filter layer in the transmissive area.

In one embodiment of the invention, the liquid crystal display apparatus further includes a pair of polarizing plates provided so as to face each other with the first substrate and the second substrate interposed therebetween, and at least one biaxial optically anisotropic medium layer provided between the first substrate and/or the second substrate and the pair of polarizing plates.

In one embodiment of the invention, the liquid crystal display apparatus further includes a pair of polarizing plates provided so as to face each other with the first substrate and the second substrate interposed therebetween, and at least one uniaxial optically anisotropic medium layer provided between the first substrate and/or the second substrate and the pair of polarizing plates.

A liquid crystal display apparatus according to the first aspect of the present invention includes a wall structure on a surface of the first substrate having a first electrode (for example, a pixel electrode), the surface being closer to the liquid crystal layer. The direction in which the liquid crystal molecules in the vertical alignment type liquid crystal layer are tilted by the electric field is regulated by the anchoring effect (orientation regulating force) of the inclining side surfaces of the wall structure. As a result, when at least a prescribed voltage (equal to or higher than the threshold voltage) is applied, a liquid crystal domain exhibiting a radially inclined orientation is stably formed in an area substantially surrounded by the wall structure. Accordingly, the orientation of liquid crystal molecules is sufficiently stabilized to provide display quality which is equal to, or higher than, that provided by the conventional technology. It is not necessary to provide an orientation regulating structure such as an electrode opening, a cut-out portion or a convexed portion on a surface of the second substrate facing the first substrate, the surface being closer to the liquid crystal layer.

In the structure in which the first electrode has an opening or a cut-out portion and a wall structure is formed in the opening or cut-out portion, the orientation regulating force provided by the inclined electric field generated around the opening or cut-out portion when a voltage is applied cooperate with the orientation regulating force provided by the wall structure to regulate the direction in which the liquid crystal molecules are tilted. This further stabilizes the radially inclined orientation. Whereas the orientation regulating force provided by the inclined electric field becomes weaker as the voltage is low, the orientation regulating force provided by the wall structure does not rely on the voltage. Therefore, the orientation regulating force provided by the wall structure is high and stably regulates the direction in the liquid crystal molecules are tilted even for gray scale display. As a result, the quality of gray scale display can be improved.

In the structure in which a dielectric structure (convexed portion) is provided at a prescribed position on a surface of the second substrate having a second electrode (for example, a counter electrode), the surface being closer to the liquid crystal layer, the radially inclined orientation is further stabilized. This improves the response characteristics in gray scale display, and also shortens the time required until an after image generated by pressuring the surface of the panel disappears.

In a liquid crystal display apparatus according to a second aspect of the present invention, the opening formed in the first electrode (for example, pixel electrode) acts to fix the position of the center of the radially inclined orientation, and the cut-out portion acts to regulate the direction in which the liquid crystal molecules in the liquid crystal domain of radially inclined orientation are tilted by the electric field. In other words, the cut-out portion is provided in the vicinity of the boundary of the liquid crystal domain of radially inclined orientation and regulates the direction in which the liquid crystal molecules are tilted by the electric field. As a result, the orientation of liquid crystal molecules is sufficiently stabilized to provide display quality which is equal to, or higher than, that provided by the conventional technology. It is not necessary to provide an orientation regulating structure such as an electrode opening, a cut-out portion or a convexed portion on a surface of the second substrate facing the first substrate (having the first electrode), the surface being closer to the liquid crystal layer. In the structure in which a wall structure on a surface of the first substrate in the light shielding area, the surface being closer to the liquid crystal layer, the orientation of the liquid crystal molecules can be stabilized without sacrificing the display quality.

When the present invention is applied to a transflective liquid crystal display apparatus, it is preferable to provide, on the second substrate, a transparent dielectric layer for controlling the thickness of the liquid crystal layer. Using the transparent dielectric layer as a light scattering layer (light diffusing layer), the structure of the liquid crystal display apparatus can be simplified. For example, it is not necessary to form roughness on a surface of the reflective electrode.

DESCRIPTION OF THE PREFERRED EMBODIMENTS

Hereinafter, a liquid crystal display apparatus according to the present invention will be described by way of examples with reference to the attached drawings. First, a structure of a liquid crystal display apparatus according to a first aspect of the present invention will be described.

Figure 1A:
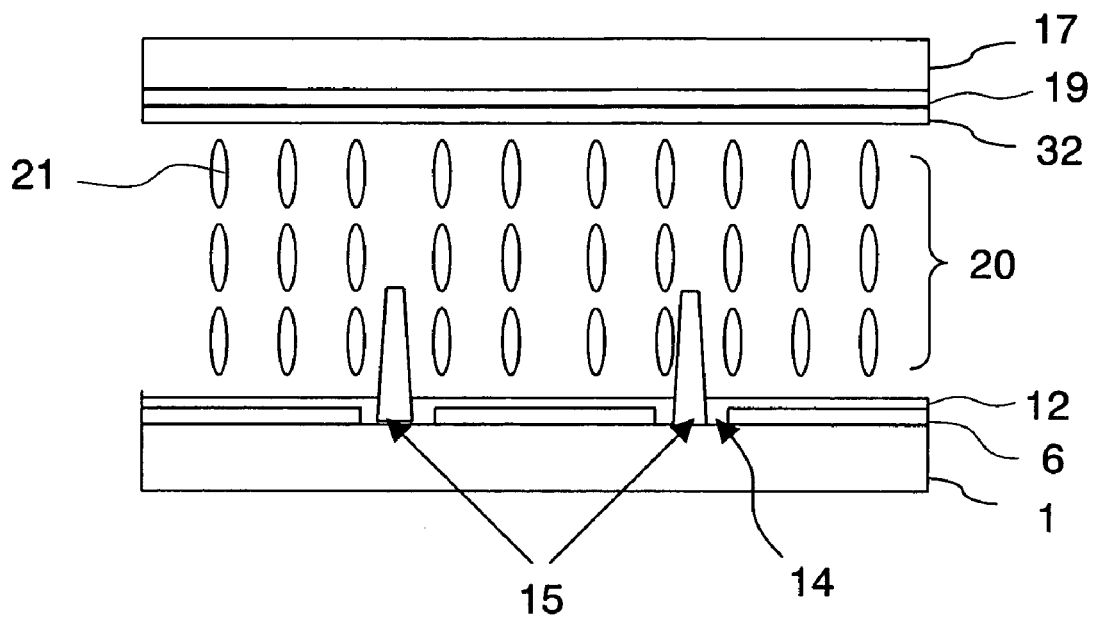
FIG. 1A illustrates an operation principle of a liquid crystal display apparatus in an example according to a first aspect of the present invention when no voltage is applied.
Figure 1B:
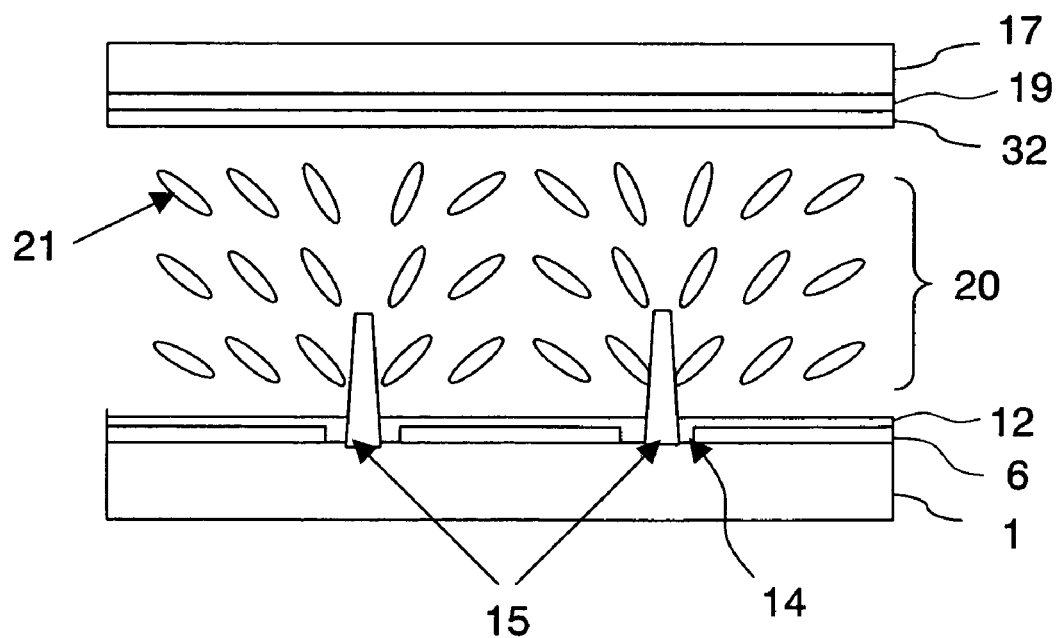
FIG. 1B illustrates the operation principle of the liquid crystal display apparatus shown in FIG. 1A when a voltage is applied.
Figure 2:
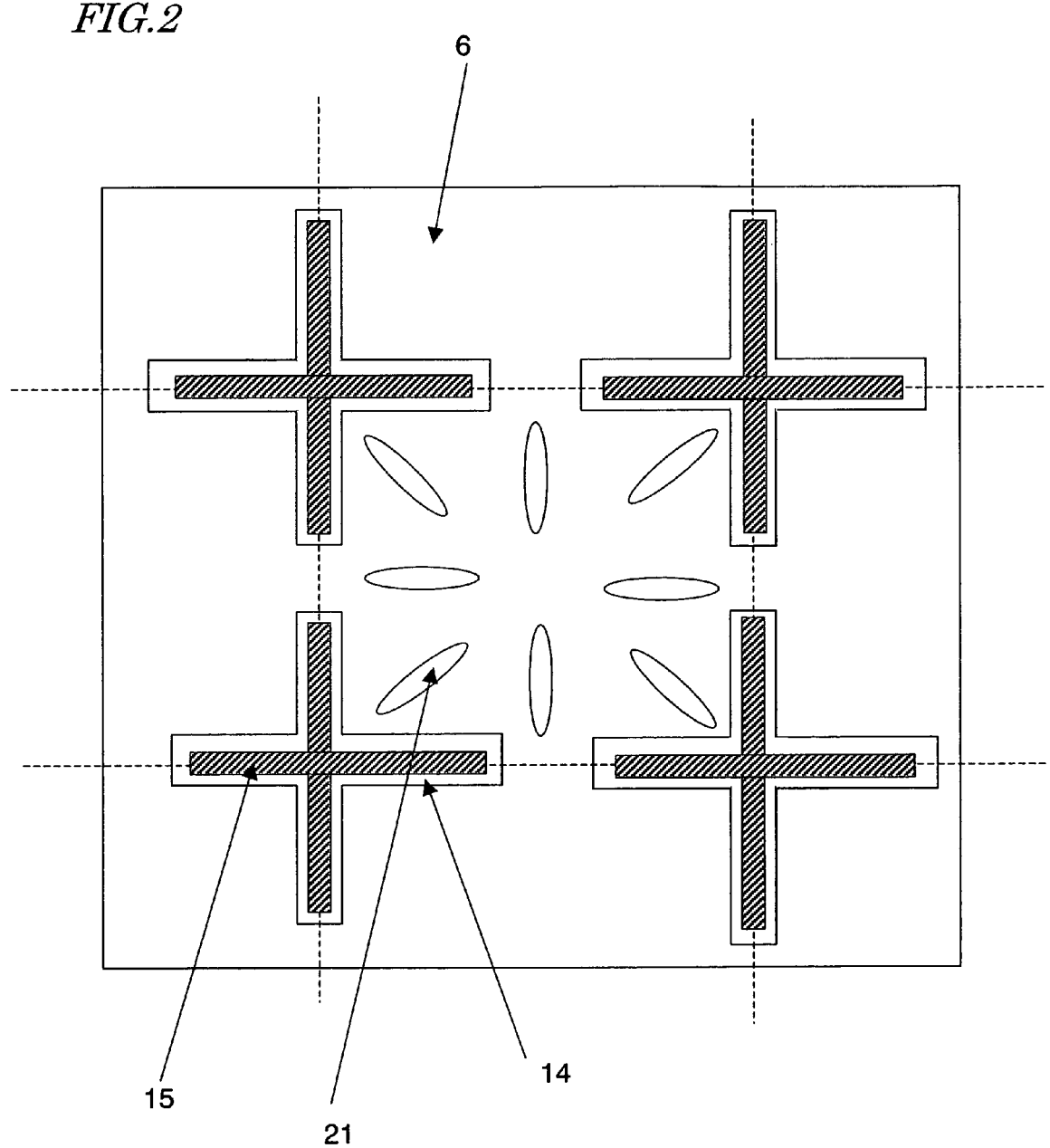
FIG. 2 is a plan view schematically illustrating the operation principle of a liquid crystal display apparatus in an example according to the first aspect of the present invention and showing an orientation state of liquid crystal molecules.

With reference to FIG. 1A, FIG. 1B, and FIG. 2, a mechanism of forming a radially inclined orientation in a liquid crystal display apparatus according in an example according to the first aspect of the present invention will be described.

FIG. 1A and FIG. 1B explain an action of an orientation regulating force provided by openings 14 and wall structures 15 provided in a pixel electrode 6. FIG. 1A schematically shows an orientation state of liquid crystal molecules when no voltage is applied, and FIG. 1B schematically shows an orientation state of the liquid crystal molecules when a voltage is applied. FIG. 1B shows the state of gray scale display. FIG. 2 is a plan view (seen in the direction of normal to the substrate) of the orientation of the liquid crystal molecules during the gray scale display.

The liquid crystal display apparatus shown in FIG. 1 includes a pixel electrode 6 having the openings 14, and a vertical alignment layer 12 on a transparent substrate 1 in this order. The liquid crystal display apparatus further includes a counter electrode 19 and a vertical alignment layer 32 provided in this order on another transparent substrate 17. A liquid crystal layer 20 provided between the two substrates contains liquid crystal molecules 21 having a negative dielectric anisotropy.

As shown in FIG. 1A, when no voltage is applied, the liquid crystal molecules 21 are aligned generally vertically with respect to surfaces of the substrates 1 and 17 owing to the orientation regulating force of the vertical alignment layers 12 and 32. Typically, the vertical alignment layer 12 is formed so as to cover the wall structures 15, and in the vicinity of inclining side surfaces of the wall structures 15, the liquid crystal molecules 21 are aligned generally vertically with respect to surfaces of the inclining side surfaces of the wall structures 15. Such a structure is omitted from FIGS. 1A and 1B for the sake of simplicity. As shown in FIG. 2, four openings 14 each having rectangular portions to form the shape of across are provided. The wall structures 15 are each provided in the respective opening 14, parallel to the rectangular portions. Each wall structure 15 is arranged such that the direction of the orientation regulating force provided by the wall structure 15 matches the direction of the orientation regulating force provided by the electric field generated by the corresponding opening 14.

When a voltage is applied, as shown in FIG. 1B, the liquid crystal molecules 21 having a negative dielectric anisotropy tend to be tilted such that the longer axis thereof is vertical to electric force lines. Therefore, the direction in which the liquid crystal molecules 21 are tilted is regulated by the inclined electric field generated around the openings 14. When the cross-shaped openings 14 and the wall structures 15 are provided as shown in FIG. 2, a liquid crystal domain having a radially inclined orientation of the liquid crystal molecules 21 is formed in an area which is substantially surrounded by the opening 14 and the wall structure 15. In the liquid crystal domain of radially inclined orientation, the liquid crystal director is oriented omnidirectionally (in directions in the plane of the substrates). This provides superb viewing angle characteristics. Herein, the term "radially inclined orientation" has the same meaning as the term "axisymmetric orientation". These terms refer to the state where liquid crystal molecules are continuously oriented without forming disclination around the center of the radially inclined orientation (central axis of axisymmetric orientation), and the longer axis of the liquid crystal molecules is oriented radially, tangentially, or spirally. In either case, the longer axis of the liquid crystal molecules has a component radially inclining from the center of the orientation (i.e., a component parallel to the inclined electric field).

In this example, the openings 14 are provided as well as the wall structures 15. Even without the openings 14, the mechanism works as follows. The anchoring action (the orientation regulating force) acting on the inclining side surfaces of the wall structures 15 regulates in which the liquid crystal molecules in the vertical orientation type liquid crystal layer are tilted. As a result, when a voltage equal to or higher than the threshold level is applied, a liquid crystal domain having a radially inclined orientation of the liquid crystal molecules is stably formed in an area substantially surrounded by the wall structures 15. As described above, when the openings 14 are provided in addition to the wall structure 15, the orientation regulating force provided by the inclined electric field which is formed around the openings 14 or cut-out portions regulates the direction in which the liquid crystal molecules are tilted, in addition to the orientation regulating force provided by the wall structures 15. Therefore, the radially inclined orientation can be further stabilized. The orientation regulating force caused by the inclined electric field becomes weaker as the voltages decreases, whereas the orientation regulating force provided by the wall structures 15 does not rely on the voltage. Thus, the orientation regulating force provided by the wall structures 15 is effective and stably regulates the direction in the liquid crystal molecules 21 are tilted even for gray scale display. This improves the gray scale display quality.

The "area substantially surrounded" by the wall structure 15 and the openings 14 is sufficiently realized as long as the liquid crystal molecules in that area are continuously regulated by the orientation regulating force to form one liquid crystal domain. It is not necessary that the wall structure 15 and/or the openings 14 completely surround the area. Namely, as shown in FIG. 2, it is sufficient that the adjacent wall structures 15 or openings 14 have a gap therebetween and one liquid crystal domain is formed inside the adjacent wall structures 15 or openings 14.

In this example, the action of the inclined electric field generated around the openings 14 is described. Also in the vicinity of cut-out portions formed in edges of the pixel electrode 6 (see, for example, cut-out portions 13 in FIG. 3), an inclined electric field is generated in the same manner and the direction in which the liquid crystal molecules 21 are tilted by the electric field is regulated.

Figure 3A:
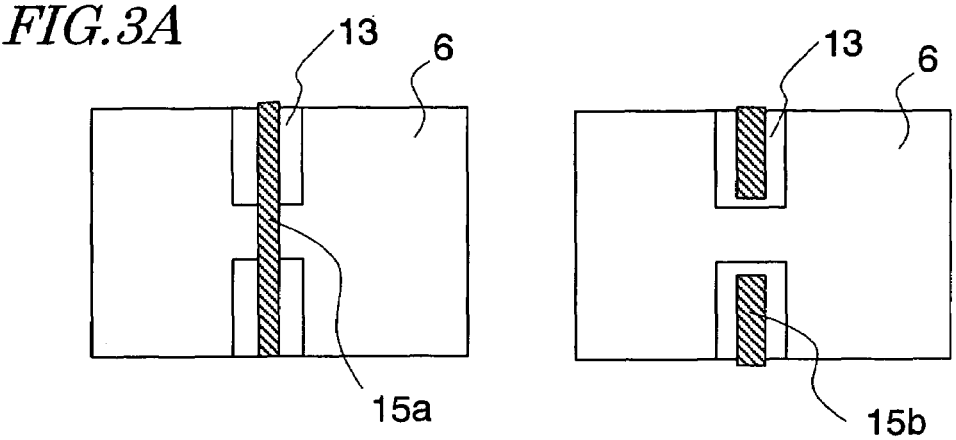
FIGS. 3A through 3C show a preferable structure of cut-out portions 13 (or openings 14) and a wall structure 15 in a liquid crystal display apparatus in an example according to the first aspect of the present invention.

Next, with reference to FIGS. 3A through 3C, the arrangement of the cut-out portions 13 (or the openings 14) and the wall structures 15 will be described. The two figures in FIG. 3A are each a plan view illustrating an exemplary arrangement in which a pair of rectangular cut-out portions 13 are provided near the center of the pixel electrode 6. The same logic is applied where the cut-out portions 13 is replaced with the openings 14 formed in the pixel electrode 6.

As described above, an area, in which a liquid crystal domain having a radially inclined orientation of the liquid crystal molecules when a voltage is applied (an area in which one liquid crystal domain is formed may be referred to as a "sub pixel area"), is not necessarily completely surrounded by the wall structures 15. Therefore, as shown in the right figure in FIG. 3A, wall structures 15b may be formed only in the cut-out portions 13 (or the openings 14). Alternatively, as shown in the left figure in FIG. 3A, one continuous wall structure 15a may be extended to run through the cut-out portions 13. Namely, when seen in the direction of the normal to the surfaces of the substrates, the wall structures 15 may be seen as a dotted line or a solid line.

Figure 3B:
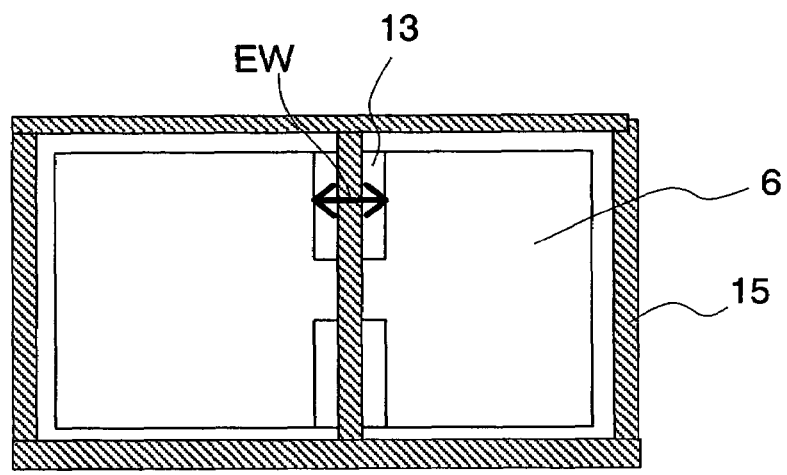
Figure 3C:
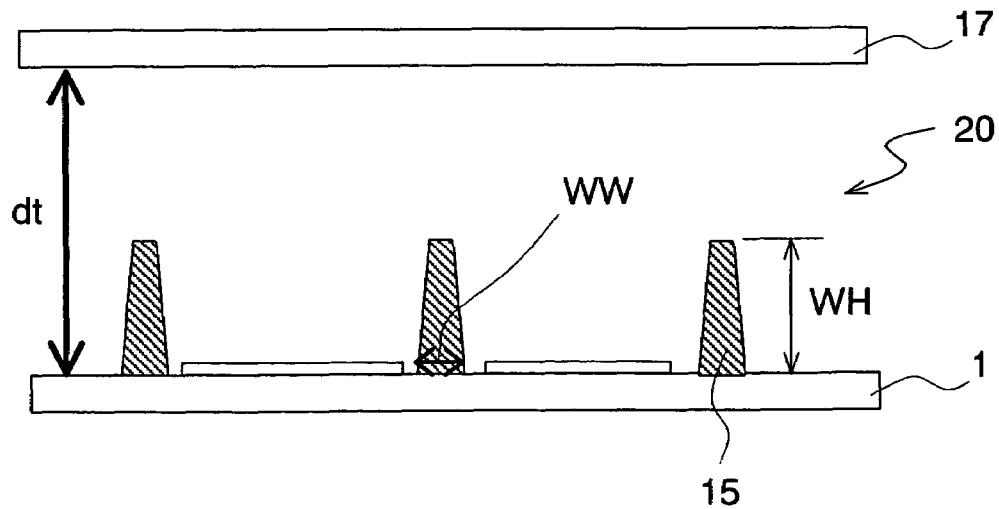

With reference to FIGS. 3B and 3C, a preferable structure for the case where the wall structure 15 is provided in, and parallel to, the rectangular cut-out portions 13 (or the openings 14) will be described.

Where the width of each rectangular cut-out portion is EW (FIG. 3B) and the width of the wall structure 15 is WW, it is preferable to provide a structure which satisfies the relationship of 0.6 EW<WW<0.9 EW. When 0.6 EW>WW, the influence of the orientation regulating force of the wall structure 15 on the liquid crystal domain in the pixel electrode area is small and thus it may be difficult to stabilize the liquid crystal domain in the pixel electrode area. When WW>0.9 EW, the wall structure 15 may not be formed in the cut-out portions 13 (misalignment) due to an alignment error during the production process. Since the liquid crystal molecules in the vicinity of the side surfaces of the wall structure 15 are inclined with respect to the vertical orientation and thus light leakage undesirably occurs in a black display state.

Regarding EW (width of the cut-out portion 13), 1.8 dt<EW<2.5 dt is preferable where dt is the thickness of the liquid crystal layer in a transmissive area. In order to stably orient the liquid crystal molecules in each pixel area using the inclined electric field generated by a voltage application, the width EW of the cut-out portion 13 is made larger than the thickness dt of the liquid crystal layer in the transmissive area. In this manner, the equipotential line is sufficiently distorted in an area having no electrode layer, and thus the orientation state is not continuous over different pixel areas.

When the width EW of the cut-out portion 13 (or the opening 14) is too large, the display area in the pixel area becomes small. This is not preferable since an area in which the display state changes while a voltage is applied becomes small. When the thickness dt of the liquid crystal layer in the transmissive area is too small, the electric field, i.e., unit V/μm becomes large and thus the amount of change of the electric field per unit thickness becomes large. As a result, substantially the same effect as provided by increasing the width EW of the cut-out portion 13 is obtained. Namely, in order to form a satisfactory liquid crystal domain of radially inclined orientation in each pixel area and increase the effective numerical aperture as much as possible at a given cell thickness (thickness of the liquid crystal layer), the width EW of the cut-out portion 13 and the thickness dt of the liquid crystal layer in the transmissive area preferably have the relationship of 1.8 dt<EW<2.5 dt. (The "effective numerical aperture" is the ratio of the area substantially contributing to display with respect to the pixel area.) When 1.8 dt>EW, the electric field per unit thickness is too weak. As a result, the radially inclined orientation of the liquid crystal molecules is not stabilized in a pixel area, and thus the position of the center of the radially inclined orientation may not be uniform among a plurality of pixel areas. When EW>2.5 dt, the size of the cut-out portion 13 (or the opening 14) is too large for the appropriate thickness of the liquid crystal layer. As a result, the effective numerical aperture is undesirably reduced.

Regarding the height WH of the wall structure 15, 0.25 dt<WH<0.4 dt is preferable. When WH<0.25 dt, the orientation regulating force provided by the wall structure 15 is too weak and thus a stable orientation state may not be obtained. When WH>0.4 dt, the following drawbacks occur. When injecting a liquid crystal material between the active matrix substrate 1 and the counter substrate 17, the wall structure 15 regularly arranged on the pixel electrode inhibit the injection, and the injection takes a long time. In addition, there is a high possibility that injection is insufficient in some areas. This is serious especially in the case of a transflective liquid crystal display apparatus. The thickness dr of the liquid crystal layer in a reflective area (see, for example, FIG. 4) is set to about half of the thickness dt in the transmissive area for the optimum optical designing. Therefore, there is even a possibility that almost no liquid crystal material is injected. For these reasons, the relationship of 0.25 dt<WH<0.4 dt is preferable.

In the above example, the wall structures 15 are formed in correspondence with the cut-out portions 13 or the openings 14. The present invention is not limited to this. As shown in FIG. 3B, the wall structure 15 may be formed in a peripheral area of the pixel electrode 6. In the peripheral area of the pixel electrode 6, a TFT (thin film transistor), a gate signal line, a source signal line and the like are formed, or a black matrix is formed on the counter substrate. Thus, the peripheral area of the pixel electrode 6 is a light shielding area which does not contribute to display. Therefore, the wall structure 15 formed in this area does not have any adverse influence on display.

The wall structure 15 may be formed so as to substantially surround an area in which a liquid crystal domain is formed (sub pixel area). Unless the wall structure 15 is formed in each sub pixel area, the orientation regulating force provided by the cut-out portion 13 or the opening 14 may not be sufficient when the voltage is low. This may cause the position of the center of the radially inclined orientation of the liquid crystal domain to be non-uniform among a plurality of pixel areas since the position cannot be maintained stably. Especially in the case of a transflective liquid crystal display apparatus, it is preferable to provide an opening or a cut-out portion at least between the transmissive area and the reflective area. It is preferable to provide the wall structure 15 in stead of this, or in addition to this. In the case where the wall structure 15 is not provided between the transmissive area and the reflective area, the orientation regulating force of an area having the wall structure 15 is stronger than that of the other area when the voltage is low. This may cause the position of the center of the radially inclined orientation to be offset from the center of the sub pixel area in the transmissive area or the reflective area.

Next, with reference to FIG. 4, the exemplary structure of the liquid crystal display apparatus according to the first aspect of the present invention will be described.

Figure 4:
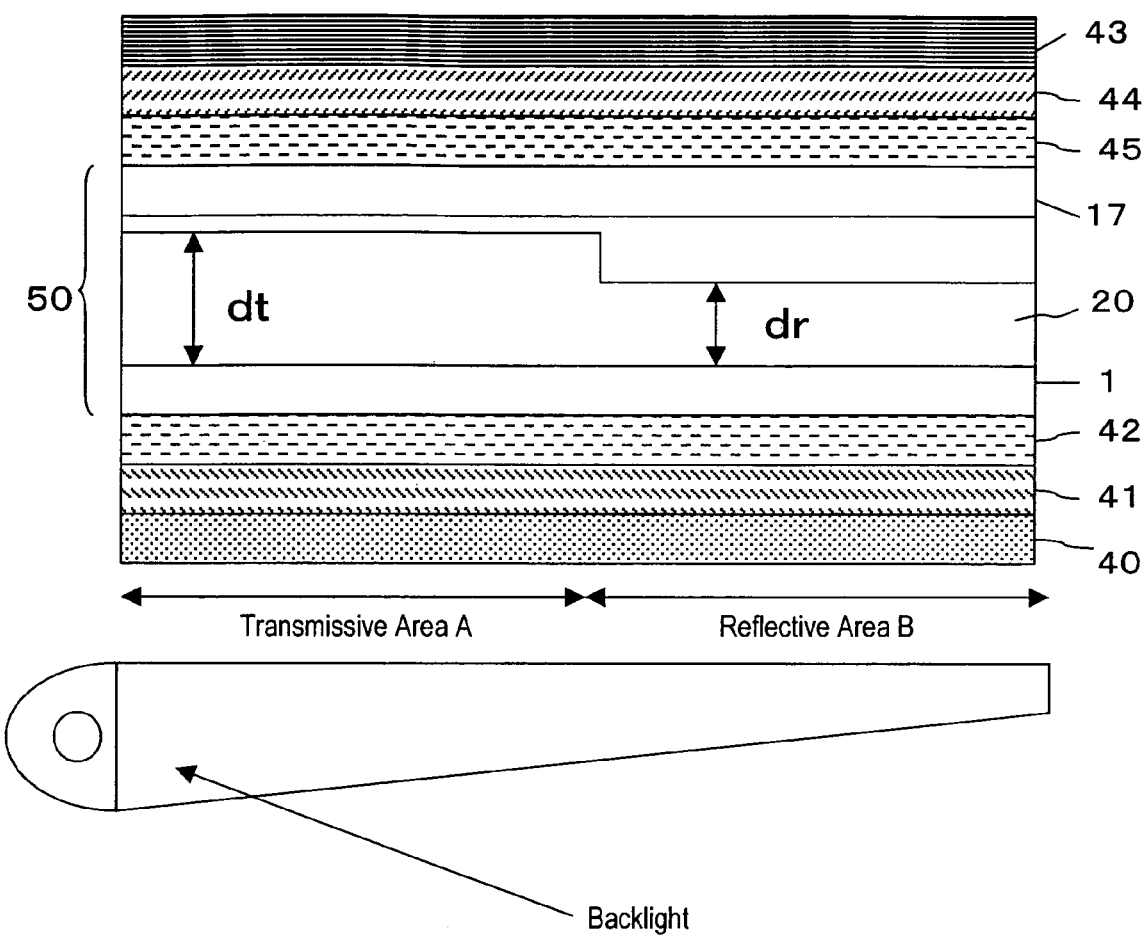
FIG. 4 shows a schematic view illustrating an exemplary structure of a liquid crystal display apparatus in an example according to the first aspect of the present invention.

The liquid crystal display apparatus shown in FIG. 4 includes a backlight, a transflective liquid crystal panel 50, a pair of polarizing plates 40 and 43 facing each other with the liquid crystal panel 50 interposed therebetween, a ¼ wave plate 41 provided between the polarizing plate 40 and the liquid crystal panel 50, a ¼ wave plate 44 provided between the polarizing plate 43 and the liquid crystal panel 50, a phase plate 42 having a negative optical anisotropy provided between the ¼ wave plate 41 and the liquid crystal panel 50, and a phase plate 45 having a negative optical anisotropy provided between the ¼ wave plate 44 and the liquid crystal panel 50. The liquid crystal panel 50 includes the transparent active matrix substrate 1, the transparent counter substrate 17, and the vertical orientation type liquid crystal layer 20. The liquid crystal panel 50 has the same structure as that of, for example, a liquid crystal display apparatus 200 described below with reference to FIG. 6.

A display operation of the liquid crystal display apparatus shown in FIG. 4 will be briefly described.

First, reflective mode display will be described. Light incident on the liquid crystal display apparatus from above passes through the polarizing plate 43 to be linearly polarized light. The linearly polarized light becomes circularly polarized light when being incident on the ¼ wave plate 44 arranged such that the transmission axis of the polarizing plate 43 and the slow axis of the ¼ wave plate 44 make an angle of 45°. The circularly polarized light passes through a color filter (not shown) formed on the substrate 17. The phase plate 45 used in this example does not give any phase difference to the light incident on the liquid crystal display apparatus in the direction of normal to the substrates 1 and 17.

When no voltage is applied, the liquid crystal molecules 21 in the liquid crystal layer 20 are aligned generally vertically with respect to the surfaces of the substrates. Therefore, the incident light passes the liquid crystal layer 20 with a phase difference of about 0 and is reflected by a reflective electrode formed on the active matrix substrate 1. The reflected circularly polarized light passes through the liquid crystal layer 20 again, passes through the color filter, and passes again through the phase plate 45 having a negative optical anisotropy while being circularly polarized light, is converted by the ¼ wave plate 44 to linearly polarized light having a polarization direction perpendicular to the polarization direction when the incident light first passed through the polarizing plate 43, and thus reaches the polarizing plate 43. Therefore, the light cannot be transmitted through the polarizing plate 43. Thus, black display is generated.

When a voltage is applied, the liquid crystal molecules 21 in the liquid crystal layer 20 are tilted to be horizontal with respect to the surfaces of the substrates from the vertical state. Therefore, the incident circularly polarized light becomes elliptically polarized light because of the birefringence of the liquid crystal layer 20, and is reflected by the reflective electrode formed on the active matrix substrate 1. The polarization state of the reflected light is further changed by the liquid crystal layer 20 and passes again through the liquid crystal layer 20, passes through the color filter, passes again through the phase plate 45 having a negative optical anisotropy, and is incident on the ¼ wave plate 44 as elliptically polarized light. Therefore, when the light reaches the polarizing plate 43, the light does not become linearly polarized light having a polarization direction perpendicular to the polarization direction when the incident light first passed through the polarizing plate 43. The light is transmitted through the plate 43. That is, by adjusting the applied voltage, the degree of which the liquid crystal molecules are tilted can be controlled, and thus the amount of the reflected light which can be transmitted through the polarizing plate 43 is modulated. Thus, gray scale display is realized.

Now, transmissive mode display will be described. The two polarizing plates 43 and 40 are arranged such that the transmission axes thereof are perpendicular to each other. Light emitted by the light source becomes linearly polarized light by the polarizing plate 40. The linearly polarized light becomes circularly polarized light when being incident on the ¼ wave plate 41 arranged such that the transmission axis of the polarizing plate 40 and the slow axis of the ¼ wave plate 41 make an angle of 45°. The circularly polarized light passes through the phase plate 42 having a negative optical anisotropy and then is incident on the active matrix substrate 1 in the transmissive area A. The phase plate 42 used in this example does not give any phase difference to the light incident on the liquid crystal display apparatus in the direction of normal to the substrates 1 and 17.

When no voltage is applied, the liquid crystal molecules 21 in the liquid crystal layer 20 are aligned generally vertically with respect to the surfaces of the substrates. Therefore, the incident light passes the liquid crystal layer 20 with a phase difference of about 0 and is incident on the active matrix substrate 1 while being circularly polarized light. The circularly polarized light passes through the liquid crystal layer 20 and the counter substrate 17, is transmitted through the phase plate 45 having a negative optical anisotropy, and reaches the ¼ wave plate 44. In the case where the lower ¼ wave plate 41 and the upper ¼ wave plate 44 are arranged such that slow axes thereof cross at 90°, the phase difference caused by passing through the lower ¼ wave plate 41 is cancelled by passing through the upper ¼ wave plate 44. Therefore, the light becomes a linearly polarized light having an original polarization direction. The polarized light which passed through the upper ¼ wave plate 44 becomes a linearly polarized light whose polarization direction is parallel to the transmission axis (i.e., polarization axis) of the polarizing plate 40 and is absorbed by the polarizing plate 40 whose polarizing direction is perpendicular to that of polarizing plates 43. Thus, black display is generated.

When a voltage is applied, the liquid crystal molecules 21 in the liquid crystal layer 20 are tilted to be horizontal with respect to the surfaces of the substrates from the vertical state. Therefore, the incident circularly polarized light becomes elliptically polarized light because of the birefringence of the liquid crystal layer 20, and passes through the counter substrate 17 (also referred to as a "color filter substrate"), the phase plate 45 having a negative optical anisotropy, and the ¼ wave plate 44 while being elliptically polarized light. Then, the elliptically polarized light reaches the polarizing plate 43. Therefore, the light incident on the polarizing plate 43 does not become linearly polarized light which is perpendicular to the linearly polarized light obtained when the incident light first passed through the polarizing plate 43. The light is transmitted through the polarizing plate 43. That is, by adjusting the applied voltage, the degree of which the liquid crystal molecules are tilted can be controlled, and thus the amount of the light which can be transmitted through the polarizing plate 43 is modulated. Thus, gray scale display is realized.

The phase plate having a negative optical anisotropy minimizes the amount of change of the phase difference occurring when the viewing angle is changed while the liquid crystal molecules are in a vertical orientation state, and suppresses the phenomenon that black images appear floating in a wide viewing angle state. Instead of the combination of the phase plate having a negative optical anisotropy and the ¼ wave plate, a biaxial phase plate including a phase plate having a negative optical anisotropy and a ¼ wave plate in an integrated manner may be used.

In the case where, as according to the present invention, normally black mode display is performed in a liquid crystal domain of radially inclined orientation, the extinction pattern caused by the polarizing plates is solved by providing a pair of ¼ wave plates above and below the liquid crystal panel so as to improve the brightness of images. (In the "normally black mode", black display is generated when no voltage is applied and white display is generated when a voltage is applied.) In the case where the normally black mode display is performed in a liquid crystal domain of radially inclined orientation in the state where the transmission axes of the upper and lower polarizing plates are perpendicular to each other, black display which is equivalent to the black display provided by a pair of polarizing plates arranged in a crossed Nicols state is realized theoretically. Therefore, a very high contrast ratio can be obtained and a wide viewing angle guided by the omnidirectional orientation can be achieved.

(Transmissive Liquid Crystal Display Apparatus)

Figure 5A:
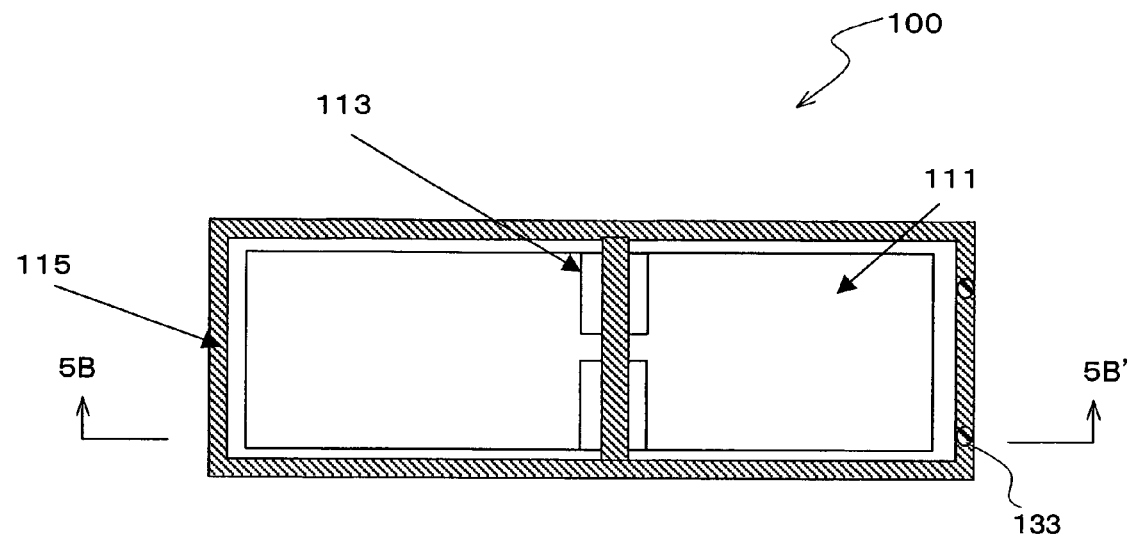
FIG. 5A is a plan view schematically illustrating a structure of a pixel in a transmissive liquid crystal display apparatus 100 in an example according to the first aspect of the present invention.
Figure 5B:
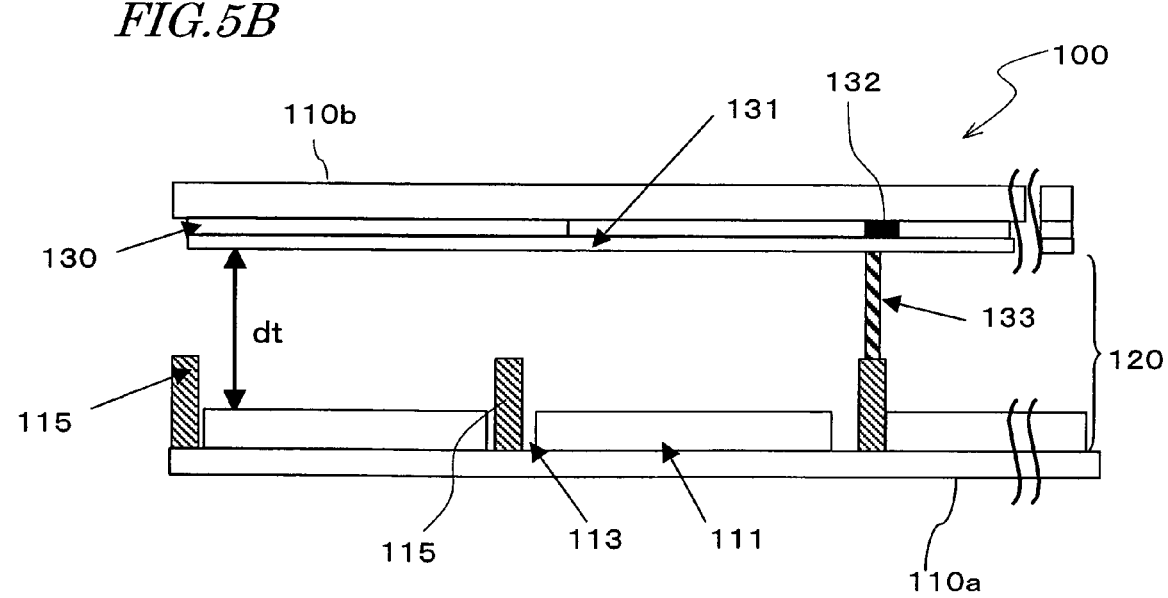
FIG. 5B is across-sectional view taken along line 5B-5B' in FIG. 5A.

With reference to FIGS. 5A and 5B, a transmissive liquid crystal display apparatus 100 in an example according to the first aspect of the present invention will be described. FIGS. 5A and 5B schematically show a structure of one pixel area of the liquid crystal display apparatus 100. FIG. 5A is a plan view thereof, and FIG. 5B is a cross-sectional view thereof taken along line 5B-5B' in FIG. 5A.

The liquid crystal display apparatus 100 includes a transparent substrate (for example, a glass substrate) 100a, a transparent substrate 110b provided to face the transparent substrate 110a, and a vertical orientation type liquid crystal layer 120 provided between the transparent substrates 110a and 110b. On surfaces of the transparent substrates 110a and 110b closer to the liquid crystal layer 120, a vertical alignment layer (not shown) is provided. When no voltage is applied, liquid crystal molecules in the liquid crystal layer 120 are aligned generally vertically with respect to the surfaces of the vertical alignment layers. The liquid crystal layer 120 contains a nematic liquid crystal material having a negative dielectric anisotropy and optionally contains a chiral material.

The liquid crystal display apparatus 100 includes pixel electrodes 111 provided on the transparent substrate 110a and a counter electrode 131 provided on the transparent substrate 110b. The liquid crystal layer 120 provided between the pixel electrodes 111 and the counter electrode 131 defines each of pixel areas. The pixel electrodes 111 and the counter electrode 131 are both formed of a transparent conductive layer (for example, an ITO layer). Typically, on a surface of the transparent substrate 110b closer to the liquid crystal layer 120, a color filter 130 is provided in correspondence with each pixel area and a black matrix (light shielding layer) 132 is provided between adjacent color filters 130. (A plurality of color filters may be collectively referred to as a "color filer layer 130".) On the color filters 130 and the black matrix 132, the counter electrode 131 is provided. Alternatively, the color filters 130 and the black matrix 132 may be provided on a surface of the counter electrode 131 closer to the liquid crystal layer 120.

The pixel electrodes 111 each have two cut-out portions 113 at prescribed positions. On the surface of the transparent substrate 110a closer to the liquid crystal layer 120, a wall structure 115 is provided. The wall structure 115 includes a wall portion surrounding the pixel electrode 111, a wall portion provided in, and parallel to, the rectangular cut-out portion 113, and a wall portion extended to connect these wall portions.

When a prescribed voltage is applied to the liquid crystal layer 120, two liquid crystal domains each exhibiting a radially inclined orientation of the liquid crystal molecules are formed in an area surrounded by the wall structure 115. The wall structure 115 in this example is provided as one continuous wall, but the wall structure may be divided into a plurality of walls. The wall structure 115, which acts to define the boundary of the liquid crystal domains, preferably has a certain length. For example, when the wall structure 115 includes a plurality of walls, each wall preferably has a length which is greater than the length of the gap between adjacent walls.

It is preferable to provide a support 133 for defining the thickness of the liquid crystal layer 120 (also referred to as a "cell gap") in a light shielding area, since this prevents display quality from being decreased. The support 133 can be formed, for example, by photolithography using a photosensitive resin. The support 133 may be formed on either the transparent substrate 110a or 110b. The support 133 is not limited to being provided on the wall structure 115 in the light shielding area as shown in FIG. 5B. When the support 133 is provided on the wall structure 115, the sum of the height of the wall structure 115 and the height of the support 133 is set to be equal to the thickness of the liquid crystal layer 120. In the case where the support 133 is provided in an area having no wall structure 115, the height of the support 133 is set to be equal to the thickness of the liquid crystal layer 120.

On the surface of the transparent substrate 110a closer to the liquid crystal layer 120, an active element such as a TFT or the like and circuit elements including a gate line and a source line connected to the TFT (none of them are shown) are provided. The transparent substrate 110a, and the circuit elements, the pixel electrodes 111, the wall structure 115, the support 133, the alignment layer and the like which are provided on the transparent substrate 110a may be collectively referred to as the active matrix substrate. The transparent substrate 110b, and the color filter layer 130, the black matrix 132, the counter electrode 132, the alignment layer and the like which are provided on the transparent substrate 110b may be collectively referred to as the counter substrate or the color filter substrate.

Although not mentioned above, the liquid crystal display apparatus 100 further includes a pair of polarizing plates facing each other with the transparent substrates 110a and 110b interposed therebetween. The pair of polarizing plates are arranged such that the transmission axes thereof are perpendicular to each other. As described above, the liquid crystal display apparatus 100 may include a biaxial optically anisotropic medium layer or a uniaxial optically anisotropic medium.

(Transflective Liquid Crystal Display Apparatus)

Figure 6A:
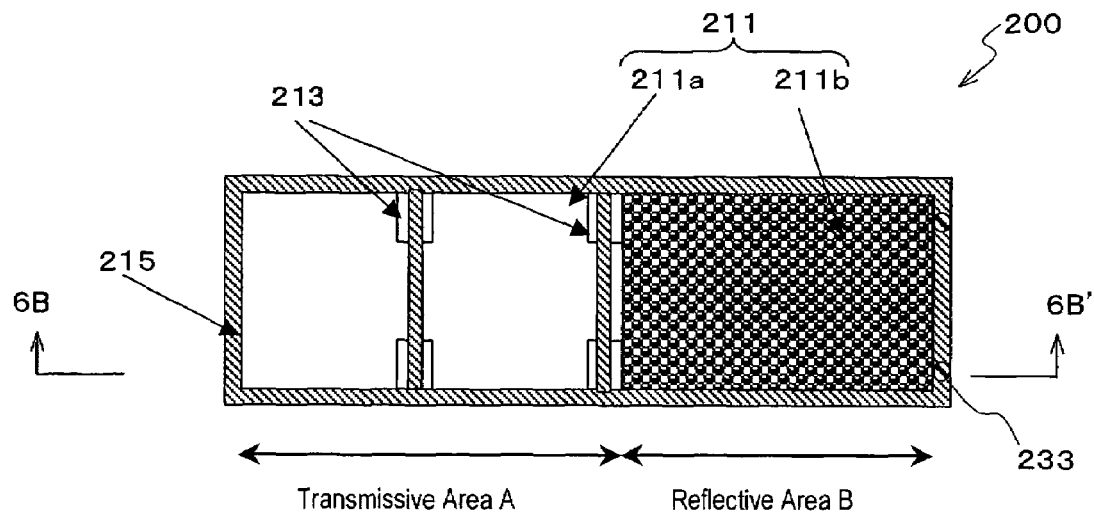
FIG. 6A is a plan view schematically illustrating a structure of a pixel area in a transflective liquid crystal display apparatus 200 in an example according to the first aspect of the present invention.
Figure 6B:
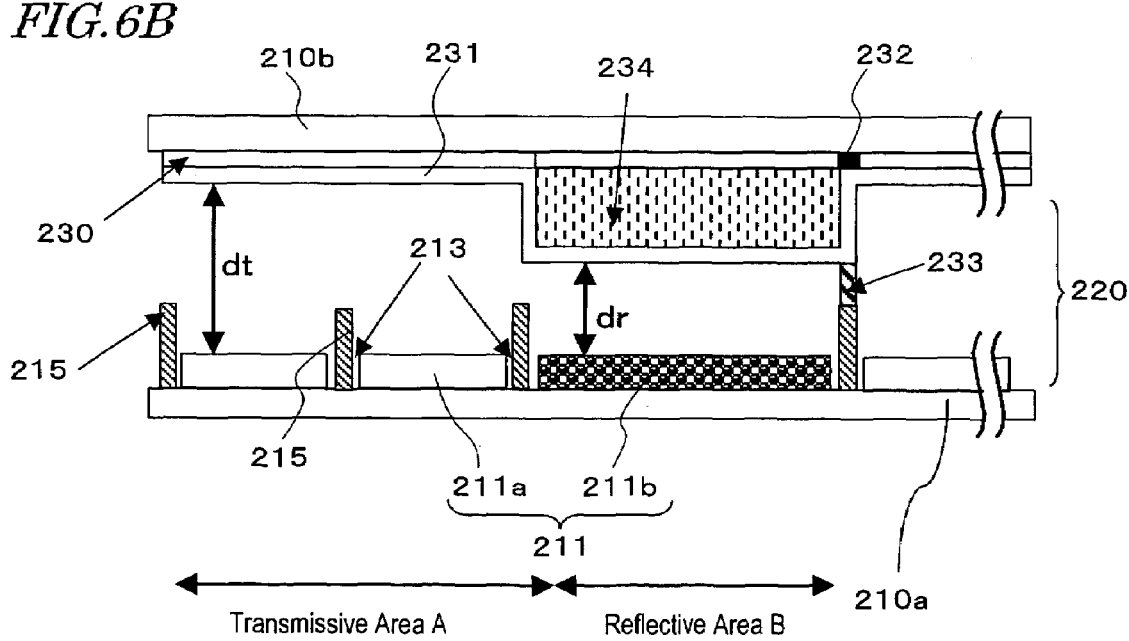
FIG. 6B is across-sectional view taken along line 6B-6B' in FIG. 6A.

With reference to FIGS. 6A and 6B, a transflective liquid crystal display apparatus 200 in an example according to the first aspect of the present invention will be described.

FIGS. 6A and 6B schematically show a structure of one pixel area of the liquid crystal display apparatus 200. FIG. 6A is a plan view thereof, and FIG. 6B is a cross-sectional view thereof taken along line 6B-6B' in FIG. 6A.

The liquid crystal display apparatus 200 includes a transparent substrate (for example, a glass substrate) 210a, a transparent substrate 210b provided to face the transparent substrate 210a, and a vertical orientation type liquid crystal layer 220 provided between the transparent substrates 210a and 210b. On surfaces of the transparent substrates 210a and 210b closer to the liquid crystal layer 220, a vertical alignment layer (not shown) is provided. When no voltage is applied, liquid crystal molecules in the liquid crystal layer 220 are aligned generally vertically with respect to the surfaces of the vertical alignment layers. The liquid crystal layer 220 contains a nematic liquid crystal material having a negative dielectric anisotropy and optionally contains a chiral material.

The liquid crystal display apparatus 200 includes pixel electrodes 211 provided on the transparent substrate 210a and a counter electrode 231 provided on the transparent substrate 210b. The liquid crystal layer 220 provided between the pixel electrodes 211 and the counter electrode 231 defines each of pixel areas. On the transparent substrate 210a, circuit elements including TFTs are provided as described below. The transparent substrate 210a and the elements provided thereon may be collectively referred to as the active matrix substrate 210a.

Typically, on a surface of the transparent substrate 210b closer to the liquid crystal layer 220, a color filter 230 is provided in correspondence with each pixel area and a black matrix (light shielding layer) 232 is provided between adjacent color filters 230. (A plurality of color filters may be collectively referred to as a "color filer layer 230".) On the color filters 230 and the black matrix 232, the counter electrode 231 is provided. Alternatively, the color filters 230 and the black matrix 232 may be provided on a surface of the counter electrode 231 closer to the liquid crystal layer 220 The transparent substrate 210b and the elements provided thereon may be collectively referred to as the counter substrate (or the color filter substrate) 210b.

The pixel electrodes 211 each have a transparent electrode 211a formed of a transparent conductive layer (for example, an ITO layer) and a reflective electrode 211b formed of a metal layer (for example, an Al layer, an alloy layer containing Al, or a laminate layer containing the Al layer or the alloy layer). As a result, the pixel area includes a transmissive area A defined by the transparent electrode 211a and a reflective area B defined by the reflective electrode 211b. The transmissive area A displays images in a transmissive mode and the reflective area B displays images in a reflective mode.

Each pixel electrode 211 has cut-out portions 213 at prescribed positions. On the surface of the transparent substrate 210a closer to the liquid crystal layer 220, a wall structure 215 is provided. The wall structure 215 includes a wall portion surrounding the pixel electrode 211, a wall portion provided in, and parallel to, the rectangular cut-out portion 213, and a wall portion extended to connect these wall portions.

When a prescribed voltage is applied to the liquid crystal layer 220, three liquid crystal domains each exhibiting a radially inclined orientation of the liquid crystal molecules are formed in an area surrounded by the wall structure 215. The wall structure 215 in this example is provided as one continuous wall, but the wall structure may be divided into a plurality of walls. The wall structure 215, which acts to define the boundary of the liquid crystal domains, preferably has a certain length. For example, when the wall structure 215 includes a plurality of walls, each wall preferably has a length which is greater than the length of the gap between adjacent walls.

FIGS. 6A and 6B show an example in which two liquid crystal domains in the transmissive area A and one liquid crystal domain in the reflective area B. The present invention is not limited to such a structure. Each domain is preferably generally square from the viewpoints of viewing angle characteristics and orientation stability.

The liquid crystal display apparatus 200 has the wall structure 215 on the transparent substrate 210a in a light shielding area provided in between adjacent pixel areas. The wall structure 215 in this example is provided as a continuous wall surrounding the pixel area, but the wall structure may be divided into a plurality of walls. The wall structure 215 acts to define the boundary of the liquid crystal domains which is formed in the vicinity of the outer perimeter of the pixel area. Thus, the wall structure 215 preferably has a certain length. For example, when the wall structure 215 includes a plurality of walls, each wall preferably has a length which is greater than the length of the gap between adjacent walls.

It is preferable to provide a support 233 for defining the thickness of the liquid crystal layer 220 (also referred to as a "cell gap") in the light shielding area, since this prevents display quality from being decreased. The support 233 can be formed, for example, by photolithography using a photosensitive resin. The support 233 may be formed on either the transparent substrate 210a or 210b. The support 233 is not limited to being provided on the wall structure 215 in the light shielding area as shown in FIG. 6B. When the support 233 is provided on the wall structure 215, the sum of the height of the wall structure 215 and the height of the support 233 is set to be equal to the thickness of the liquid crystal layer 220 In the case where the support 233 is provided in an area having no wall structure 215, the height of the support 233 is set to be equal to the thickness of the liquid crystal layer 220.

Next, a preferable structure unique to the transflective liquid crystal display apparatus 200 capable of performing transmissive mode display and reflective mode display will be described.

In the transmissive mode display, light used for display passes through the liquid crystal layer 220 only once. By contrast, in the reflective mode display, light used for display passes through the liquid crystal layer 220 twice. Accordingly, as schematically shown in FIG. 6B, it is preferably to set the thickness dt of the liquid crystal layer 220 in the transmissive area A about twice as large as the thickness dr of the liquid crystal layer 220 in the reflective area B. Such setting substantially equalizes retardations given by the liquid crystal layer 220 to the light in both modes. dt=0.5 dt is most preferable. As long as the relationship of 0.3 dt<dr<0.7 dr is obtained, satisfactory display is realized in both modes. In some uses, dt=dr is acceptable.

The liquid crystal display apparatus 200 includes a transparent dielectric layer 234 above the glass substrate 210b only in the reflective area B. This is provided in order to make the thickness of the liquid crystal layer 220 in the reflective area B smaller than the thickness of the liquid crystal layer 220 in the transmissive area A. The counter electrode 231 is preferably provided so as to cover the transparent dielectric layer 234, which is on the liquid crystal layer 220 as shown in FIG. 6B. With the structure of providing the transparent dielectric layer 234 on the counter substrate 210b, it is not necessary to provide a step below the reflective electrode 211b using an insulating layer or the like. This offers an advantage of simplifying the production process of the active matrix substrate 210a. In the case where the reflective electrode 211b is provided on an insulating layer which is formed for providing a step for adjusting the thickness of the liquid crystal layer 220, the following problems occur: light used for the transmissive display is shielded by the reflective electrode covering the inclining surfaces (tapered surfaces) of the insulating layer; and light reflected by the reflective electrode formed on the inclining surface of the insulating layer is repeatedly reflected internally, and thus is not effectively used for reflective display. These problems are suppressed by the above-mentioned structure, and the utilization factor of light can be improved.

It is also preferable to form the transparent dielectric layer 234 of a layer having a light scattering function (diffusive reflection function). In this case, white display close to satisfactory paper white display can be realized without providing the reflective electrode 211b with the diffusive reflection function. White display close to satisfactory paper white display can also be realized by providing roughness to the surface of the reflective electrode 211b even without providing the transparent dielectric layer 234 with the light scatting function. However, in this case, the position of the center of the radially inclined orientation may not be stabilized when the roughness has a certain shape. By contrast, use of the transparent dielectric layer 234 having the light scattering function and the reflective electrode 211b having a flat surface offers an advantage of stabilizing the position of the center more certainly owing to the openings 214 formed in the reflective electrode 211b. In the case where the roughness is formed on the surface of the reflective electrode 211b in order to provide the reflective electrode 211b with the diffusive reflection function, it is preferable that the roughness is continuously wave-shaped so as to prevent generation of interference colors. Thus, the position of the center of the radially inclined orientation is stabilized.

Light used for display in the transmissive mode passes through the color filter layer 230 only once, whereas light used for display in the reflective mode passes through the color filter layer 230 twice. Accordingly, where the color filter layer 230 in the transmissive area A and the color filter layer 230 in the reflective area B have the same optical concentration, the color purity and/or the luminance in the reflective mode may be reduced. In order to suppress this problem, it is preferable to make the optical concentration of the color filter layer 230 in the reflective area B smaller than that of the color filter layer 230 in the transmissive area A. Herein, the optical concentration is a value characterizing the color filter layer. The optical concentration becomes smaller as the thickness of the color filter layer is made smaller. The optical concentration also becomes smaller as the concentration of the colorant added is reduced while the thickness of the color filter layer is maintained.

Hereinafter, display characteristics of liquid crystal display apparatuses produced as test models will be specifically described.

TEST EXAMPLE 1

Figure 7A:
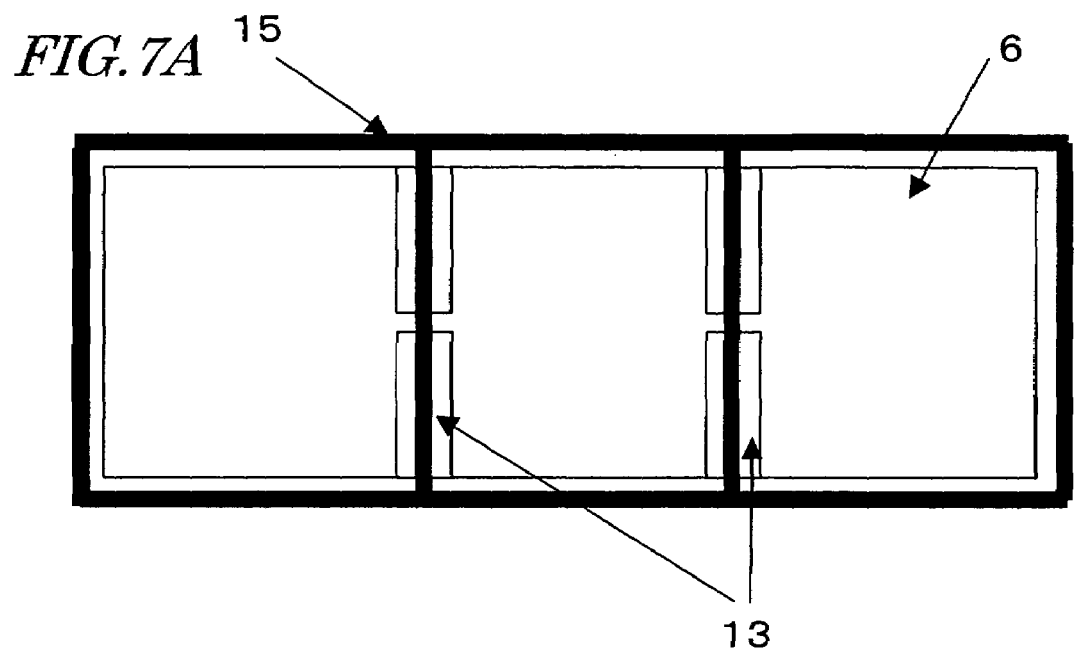
FIG. 7A is a plan view of an arrangement of cut-out portions and a wall structure in a pixel electrode in test examples 1 through 7.

On an active matrix substrate having signal lines and TFTs (thin film transistors) formed thereon, a pixel electrode 6 (ITO layer; transparent electrode) and a wall structure 15 shown in FIG. 7A were formed. The width of each cut-out portion 13 was 8 μm and the width of the wall structure 15 was 6 μm. A support for defining the cell thickness was formed in an area which does not have the wall structure 15. The height of the support was 4.0 μm.

A vertical alignment agent was applied to the active matrix substrate produced in this manner and a counter substrate (color filter substrate) having a color filter layer and an electrode layer, and the substrates were baked. Thus, a vertical alignment layer was formed on each of the substrate. The active matrix substrate and the counter substrate were combined, a liquid crystal material having a negative dielectric anisotropy (Δn=0.101, Δε=−5.0) was injected between the substrates, and the substrates were sealed. Then, an optical film was provided on outer surfaces of both substrates to produce a liquid crystal display apparatus.

The liquid crystal display apparatus produced in test example 1 had the structure including the following elements from top: polarizing plate (on the side of the observer), ¼ wave plate (phase plate 1), phase plate having a negative optical anisotropy (phase plate 2; NR plate), liquid crystal layer (interposed between the color filter substrate (above) and the active matrix substrate (below)), phase plate having a negative optical anisotropy (phase plate 3; NR plate), ¼ wave plate (phase plate 4), and polarizing plate (on the side of the backlight). The upper and lower ¼ wave plates (phase plates 1 and 4) were arranged such that the slow axes thereof were perpendicular to each other. The phase difference between the upper and lower ¼ wave plates was 140 nm (¼ of the wavelength of visible light (560 nm)).

The phase difference between the phase plates having a negative optical anisotropy (phase plates 2 and 3) was 135 nm in a direction parallel to the optical axis (vertical to the substrates) and in a direction parallel to the substrates. The two polarizing plates (on the side of the observer and on the side of the backlight) were arranged such that the transmission axes thereof were perpendicular to each other.

Figure 8:
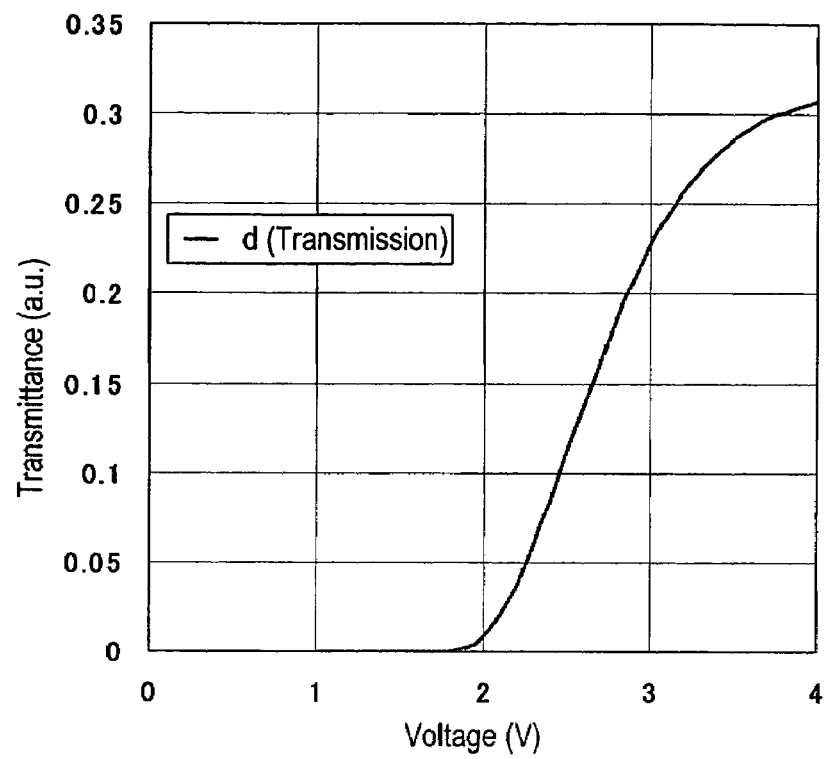
FIG. 8 is a graph illustrating the voltage vs. transmittance characteristic of test example 1.
Figure 9:
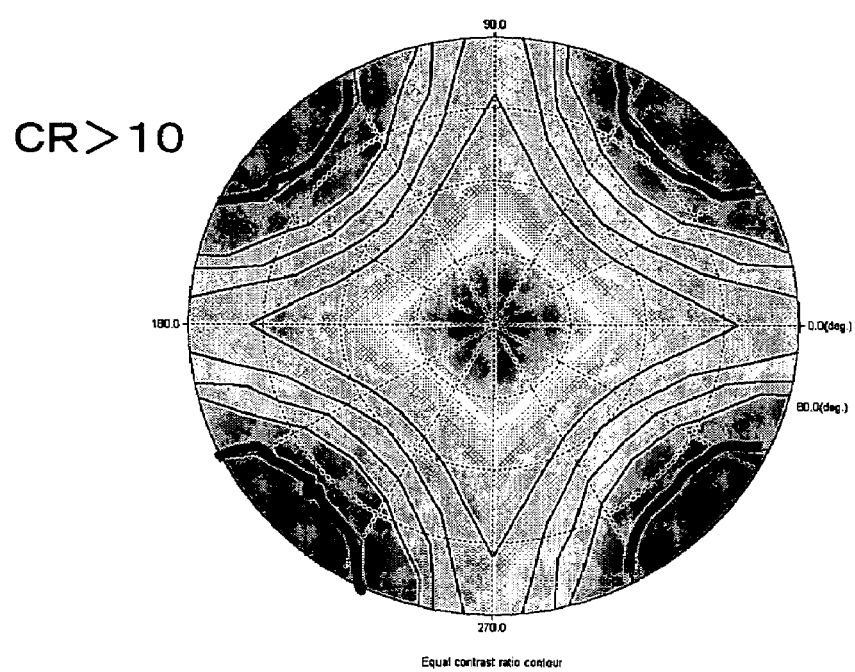
FIG. 9 shows equicontrast characteristics of test example 1.

A driving signal was applied to the liquid crystal display apparatus (more specifically, 4 V was applied to the liquid crystal layer) to evaluate the display characteristics. Test example 1 had a satisfactory voltage vs. transmittance characteristic as shown in FIG. 8. FIG. 9 shows the results of evaluation of the viewing angle vs. contrast characteristics in the transmissive mode display. The viewing angle characteristic was substantially symmetrical in all the directions in the transmissive mode display. The area of CR>10 (represented by the thick lines) was satisfactory at ±80°. The contrast in the transmissive mode display was also as high as 300:1 or greater in the front direction. Regarding the response speed in the gray scale display, the response time for level 6 to level 7 (low voltage close to black display) in 8 levels was 20 msec. This was faster than the case where no wall structure was provided.

TEST EXAMPLE 2

On an active matrix substrate, a pixel electrode 6 having cut-out portions 13 having substantially the same shape as those of test example 1 was formed. Then, a wall structure was formed on the pixel electrode (ITO) as shown in FIG. 7A. The width of each cut-out portion 13 was 6 μm and the width of the wall structure 15 was 3 μm. The height of a support for defining the cell thickness was 3.0 μm. After this, the liquid crystal display apparatus was produced in the same manner as in test example 1. The liquid crystal display apparatus produced in this test example showed a satisfactory viewing angle characteristic and a high contrast characteristic in all the directions.

TEST EXAMPLE 3

On an active matrix substrate having a pixel electrode 6 and a wall structure 15 substantially the same as those of test example 1, a support for defining the cell thickness was formed in an area which does not wall structure 15 (in a light shielding area). The height of the support was 4.5 μm. After this, the liquid crystal display apparatus was produced in the same manner as in test example 1.

When the liquid crystal display apparatus in test example 3 was observed from the side of the wide viewing angle, roughness was observed in some of the pixel areas. As a result of observing the pixel areas with roughness in a crossed Nicols manner, it was found that the center of the radially inclined orientation was offset from the center of each of the observed pixel areas. This shows that a width of the cut-out portion which is too large for the thickness of the liquid crystal layer is not preferable.

TEST EXAMPLE 4

A pixel electrode 6 and a wall structure 15 substantially the same as those of test example 1 were formed. The width of the cut-out portion 13 was 6 μm and the width of the wall structure 15 was 1 μm. The height of the support for defining the cell gap was set to 3.0 μm. After this, the liquid crystal display apparatus was produced in the same manner as in test example 1.

When the liquid crystal display apparatus in test example 4 was observed from the side of the wide viewing angle, roughness was observed in some of the pixel areas. As a result of observing the pixel areas with roughness in a crossed Nicols manner, it was found that the center of the radially inclined orientation was offset from the center of each of the observed pixel areas. This shows that a width of the wall structure which is too small as compared to the width of the cut-out portion is not preferable.

TEST EXAMPLE 5

On an active matrix substrate having a pixel electrode 6 substantially the same as that of test example 1, a wall structure 15 having a width of 8 μm was formed. After this, the liquid crystal display apparatus was produced in the same manner as in test example 1.

When the liquid crystal display apparatus in test example 5 was observed, black images appeared as floating in black display in some of the pixel areas. As a result of observing the pixel areas with such black images by a polarizing microscope, it was found that the wall structure 15 was present in a peripheral region of the transmissive area and light leakage occurred. This shows that a width of the wall structure which is larger than the width of the cut-out portion is not preferable.

TEST EXAMPLE 6

On an active matrix substrate having a pixel electrode 6 substantially the same as that of test example 1, a wall structure 15 was formed. The width of the cut-out portion 13 was 8 μm and the width of the wall structure 15 was 5 μm. A support for defining the cell thickness was formed in an area which does not have the wall structure 15. The height of the support was 2.5 μm. After this, the liquid crystal display apparatus was produced in the same manner as in test example 1.

In the liquid crystal display apparatus in test example 6, the change in retardation based on the change in the voltage signal was small and thus the transmittance of the liquid crystal layer was low. Therefore, the display was relative dark. This shows that a thickness of the liquid crystal layer in the transmissive area which is smaller than the width of the cut-out portion is not preferable.

TEST EXAMPLE 7

On an active matrix substrate, a pixel electrode 6 having a cut-out portion 13 having substantially the same shape as that of test example 1 was formed. No wall structure was formed. A support for defining the cell thickness was formed on the active matrix substrate. The height of the support was 3.6 μm. After this, the liquid crystal display apparatus was produced in the same manner as in test example 1.

The response time in the gray scale display (level 6 to level 7 in 8 levels) of the liquid crystal display apparatus in test example 7 was evaluated. The response was as slow as about120 msec. This is because it takes a long time to stabilize the liquid crystal molecules when the orientation regulating force provided by the cut-out portion 13 in black display is weak.

A color filter layer as a part of the counter substrate to the active matrix substrate, and then a step having a thickness of about 1.8 μm was formed in the reflective area. On the color filter layer, an ITO electrode layer was formed. Thus, the counter substrate (color filter substrate) was produced.

Figure 10:
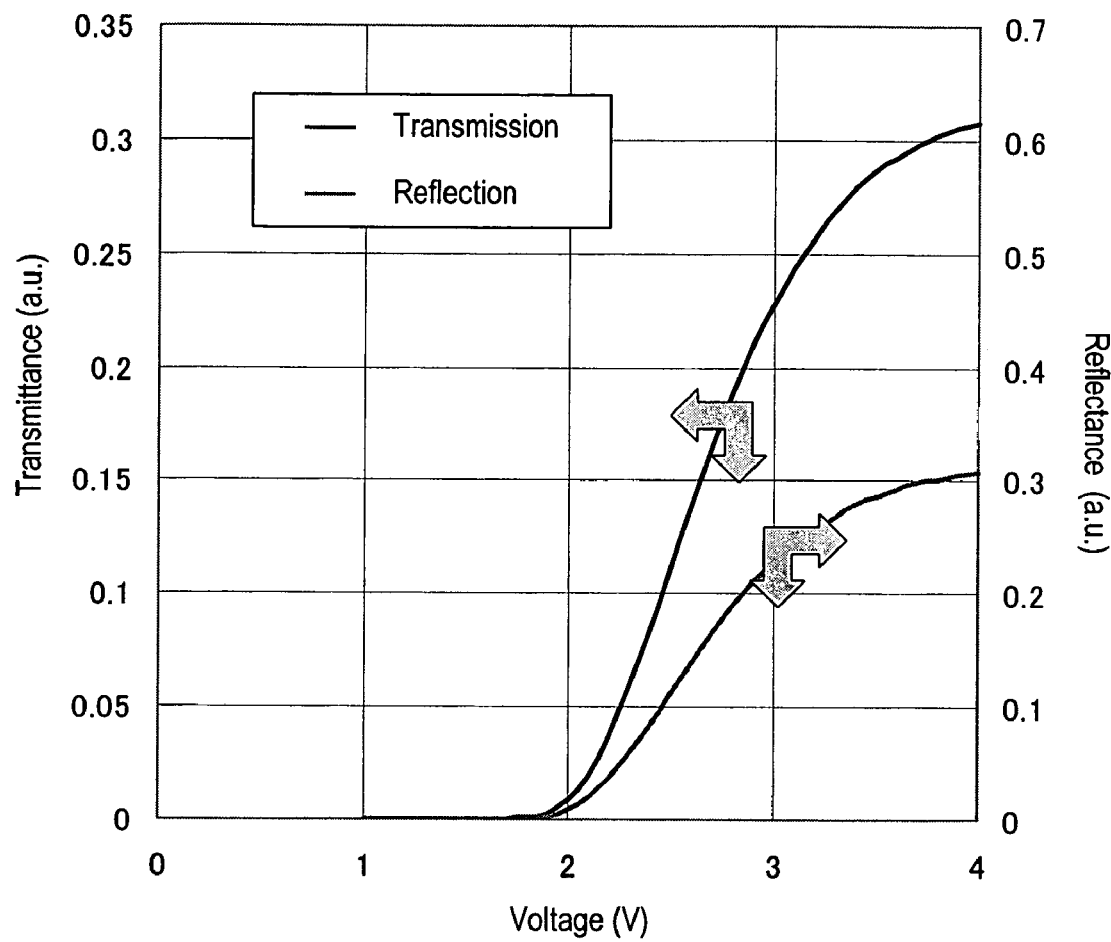
FIG. 10 is a graph illustrating the voltage vs. reflectance/transmittance characteristic of test example 8.

A vertical alignment agent was applied to the obtained active matrix substrate and counter substrate, and the substrates were baked at 180° C. for 1.5 hours. Thus, a vertical alignment layer was formed on each of the substrate. The active matrix substrate and the counter substrate were combined, a liquid crystal material having a negative dielectric anisotropy was injected between the substrates, and the substrates were sealed. Then, as in test example 1, an optical film was provided on outer surfaces of both substrates to produce a liquid crystal display apparatus, based on the optical film setting. Thus, the liquid crystal display apparatus was produced. The thickness of the liquid crystal layer in the transmissive area was 3.6 μm and the thickness of the liquid crystal layer in the reflective area was 1.8 μm because of the height of the step of 1.8 μm formed on the color filter layer and the height of the support of 3.6 μm. The display characteristics in the transmissive mode display were substantially as satisfactory as in test example 1. The characteristics in the reflective mode display was about 8.5% (converted based on the numerical aperture of 100%) based on the standard diffusive plate, and the contrast ratio was 20. The liquid crystal display apparatus in test example 8 showed satisfactory voltage vs. reflectance characteristic as shown in FIG. 10.

Table 1 shows the display quality of the liquid crystal display apparatuses in the above-described test examples with different values for the width of the cut-out portion 13, the width of the wall structure 15, and the thickness of the liquid crystal layer in the transmissive area.

TABLE 1

| | EW (μm) | WW (μm) | dt (μm) | Fulfill 0.4EW < WW < 0.8EW? | Fulfill 1.8dt < EW < 2.5dt? | Display quality |
|---|---|---|---|---|---|---|
| Test example 1 | 8 | 6 | 4 | 3.2(0.4EW) < WW = 6 < 6.4 (EW = 8): ○ | 6.48(1.8dt) < EW = 8 < 9 (2.5dt): ○ | Good |
| Test example 2 | 6 | 3 | 3 | 2.4(0.4EW) < WW = 3 < 4.8 (0.8 * EW): ○ | 5.4 < EW = 6 < 7.5 (2.5dt): ○ | Good |
| Test example 3 | 6 | 3 | 4.5 | 2.4(0.4EW) < WW = 3 < 4.8 (0.8 * EW): ○ | 8.1(1.8dt) < EW = 6: X | Position of center different pixel by pixel→roughness |
| Test example 4 | 6 | 1 | 3 | 2.4(0.4EW) > WW = 1: X | 5.4 < EW = 6 < 7.5 (2.5dt): ○ | Position of center different pixel by pixel→roughness |
| Test example 5 | 8 | 8 | 3.6 | WW = 8 > 6.4(0.8 * EW): X | | Light leakage in display area |
| Test example 6 | 8 | 5 | 2.5 | 3.2(0.4EW) < WW = 5 < 6.4 (EW = 8): ○ | EW = 5 = 5(2.5dt): X | Transmittance reduced |
| Test example 8 | 7 | 9 | 3.6 | 2.8(0.4EW) < WW = 5 < 5.6 (0.8 * EW): ○ | 6.48(1.8dt) < EW = 7 < 9 (2.5dt): ○ | Good |

TEST EXAMPLE 8

Figure 7B:
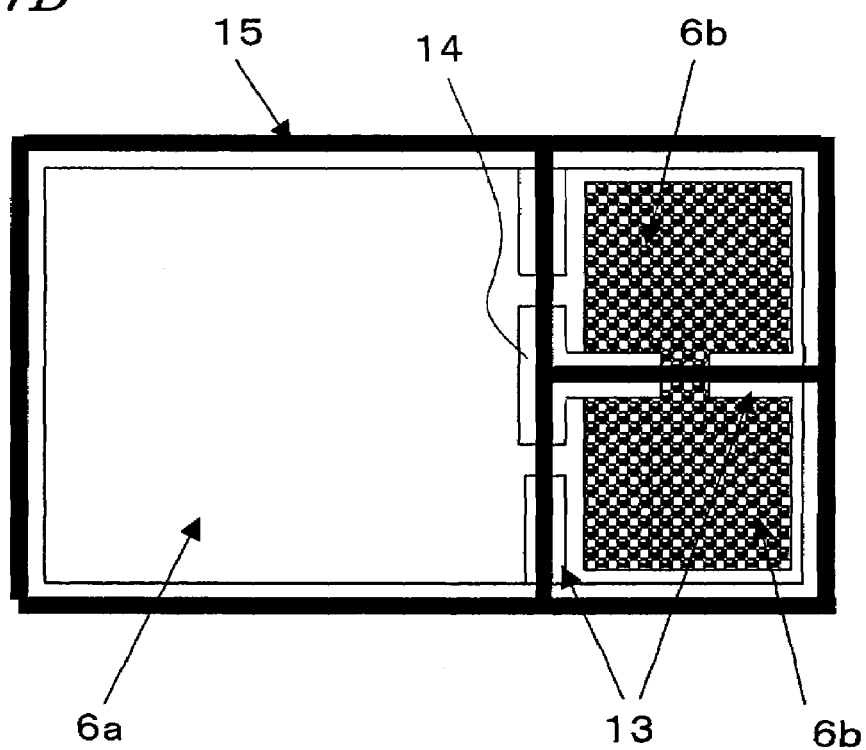
FIG. 7B is a plan view of an arrangement of cut-out portions and a wall structure in a pixel electrode in test example 8.

As shown in FIG. 7B, on an active matrix substrate, a transparent electrode 6a (ITO layer) and reflective electrodes 6b (Al) were formed. The transparent electrode 6a formed a transmissive area, and the reflective electrodes 6b formed a reflective area. On the electrodes 6a and 6b, a wall structure 15 was formed. The width of each cut-out portion 13 was 8 μm and the width of the wall structure 15 was 6 μm. A support for defining the cell thickness was formed outside the display area. The height of the support was 3.6 μm.

As described above, according to the first aspect of the present invention, a liquid crystal display apparatus having satisfactory viewing angle characteristics over all the directions and also high contrast characteristics can be produced by forming a wall structure having an electrode cut-out portion and an inclining side surface on one of the substrates (active matrix substrate in this example) for regulating the orientation of liquid crystal molecules.

Next, a liquid crystal display apparatus in another example according to the first aspect of the present invention will be described.

The liquid crystal display apparatus described below is different from the liquid crystal display apparatus described above in that the substrate having the wall structure (first substrate; for example, the active matrix substrate) and the other substrate (second substrate; for example, counter (or color filter) substrate) each have a dielectric structure (convexed portions). In the following description, the elements which are identical to those in the above-described example will bear identical reference numerals therewith and detailed descriptions thereof will be omitted.

The liquid crystal display apparatus in the above example stabilizes a radially inclined orientation of the liquid crystal layer with a simple structure of providing an orientation regulating structure (wall structure, electrode opening, and/or electrode cut-out portion) on one substrate. In the liquid crystal display apparatus in this example, a dielectric structure is provided on one substrate in an area substantially surrounded by the wall structure provided on the other substrate. Thus, the orientation of liquid crystal molecules is regulated by both the substrates facing each other. Owing to such a structure, the radially inclined orientation is further stabilized. As a result, for example, the recovery force when the surface of the panel is pressed is increased and thus the disturbance in the orientation tends not to occur. Even if the disturbance in the orientation occurs, the orientation is recovered in a shorter time. In addition, the effect of shortening the response time in gray scale display is enhanced.

With reference to FIGS. 11A, 11B, 12A, 12B and 12C, the orientation state of liquid crystal molecules in the liquid crystal display apparatus in this example will be described.

Figure 11A:
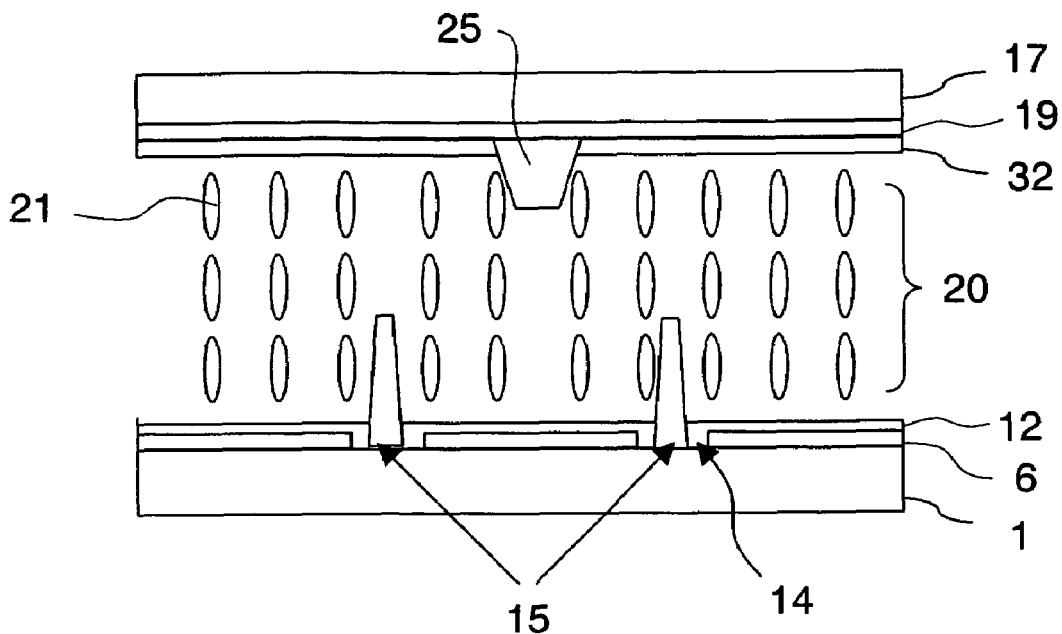
FIG. 11A shows an orientation state of liquid crystal molecules in a liquid crystal display apparatus in another example according to the first example of the present invention when no voltage is applied.
Figure 11B:
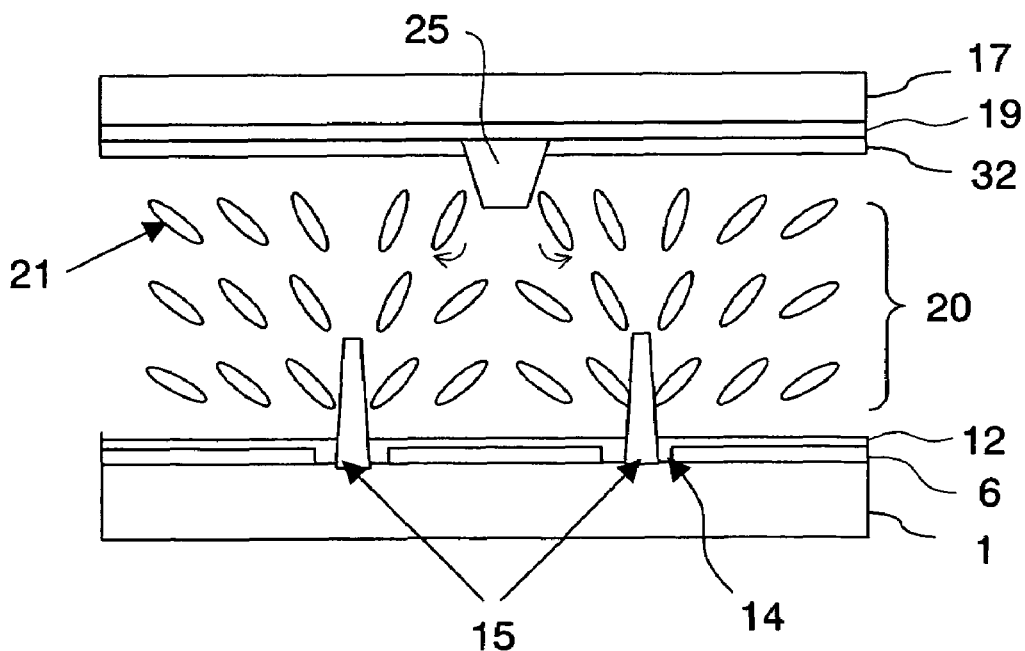
FIG. 11B shows an orientation state of the liquid crystal molecules in the liquid crystal display apparatus shown in FIG. 11A when a voltage is applied.

FIGS. 11A and 11B correspond to FIGS. 1A and 1B in the above-described example, respectively. FIG. 11A schematically shows an orientation state of liquid crystal molecules when no voltage is applied, and FIG. 11B schematically shows an orientation state of the liquid crystal molecules when a voltage is applied.

As described with reference to FIGS. 1A and 1B, a liquid crystal domain having a radially inclined orientation of the liquid crystal molecules is formed in an area which is substantially surrounded by the opening 14 and the wall structure 15 (sub pixel area). The liquid crystal domain is formed by the inclined electric field generated by the openings 14 formed in the pixel electrodes 6 and the orientation regulating force (anchoring effect) provided by the inclining side surfaces of the wall structure 15 formed in the openings 14. The liquid crystal display apparatus in this example further includes a dielectric structure 25 at substantially the center of the sub pixel area on a surface of the upper substrate 17 closer to the liquid crystal layer 20. The radially inclined orientation of the liquid crystal molecules 21 is further stabilized by the orientation regulating force (anchoring effect) of inclining side surfaces of the dielectric structure 25. Although not clearly shown in FIGS. 11A and 11B for the sake of simplicity, the vertical alignment layer 32 is provided so as to cover the dielectric structure 25.

As can be seen from FIG. 11B, the orientation regulating force provided by the inclining side surfaces of the dielectric structure 25 provided on a surface of the second substrate (counter substrate) 17 closer to the liquid crystal layer 20 acts to orient the liquid crystal molecules 21 in the same direction as the orientation regulating force provided by the orientation regulating structure formed on the first substrate (active matrix substrate), for example, the wall structure and the electrode openings. Therefore, the radially inclined orientation of the liquid crystal molecules in the sub pixel area is further stabilized. Since the radially inclined orientation of the liquid crystal molecules is formed around the dielectric structure 25 provided at substantially the center of the sub pixel area, the center of the radially inclined orientation is fixed at a position in the vicinity of the dielectric structure 25.

When a voltage is applied, the liquid crystal molecules having a negative dielectric anisotropy tilt to be perpendicular to the direction of the electric field i.e., such that the longer axis of the liquid crystal molecules is parallel to the surfaces of the substrates). It is preferable to provide an arrangement such that the liquid crystal molecules tilt externally (as shown by arrows in FIG. 11B) to the inclining side surfaces of the dielectric structure 25. In the case where, the liquid crystal molecules tilt internally, a disclination line maybe generated.

As described above, the orientation regulating structure provided on the first substrate (wall structure, electrode openings, etc.) regulates the orientation direction of the liquid crystal molecules in the peripheral region of the sub pixel area, and the orientation regulating structure provided on the substrate (dielectric structure) regulates the orientation direction of the liquid crystal molecules substantially at the center of the sub pixel area. Owing to such setting, the response time in gray scale display can be shortened, or the time required until an after image, which is generated when the surface of the panel is pressed, disappears can be shortened. The reasons will be described with reference to FIGS. 12A through 12C.

Figure 12A:
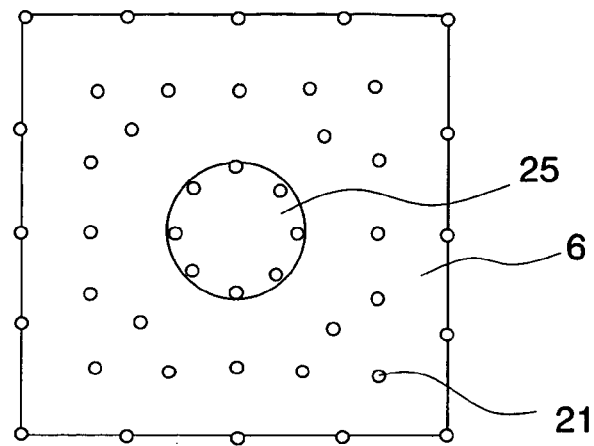
FIG. 12A schematically shows an orientation state of liquid crystal molecules in a sub pixel area of the liquid crystal display apparatus shown in FIG. 11A when no voltage is applied.
Figure 12B:
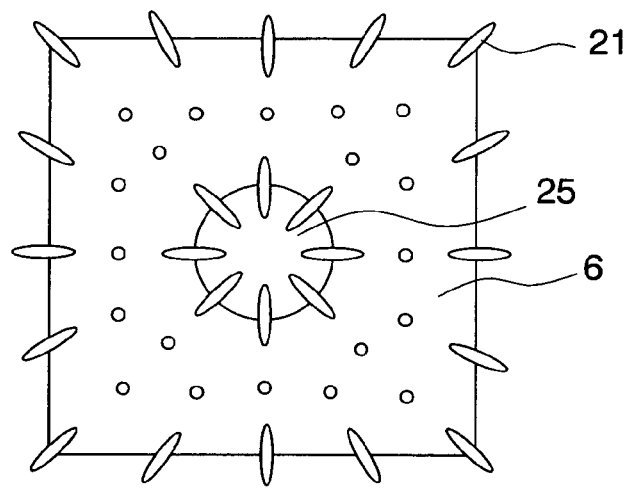
FIG. 12B schematically shows an orientation state of the liquid crystal molecules in the sub pixel area of the liquid crystal display apparatus shown in FIG. 12A immediately after a voltage is applied.
Figure 12C:
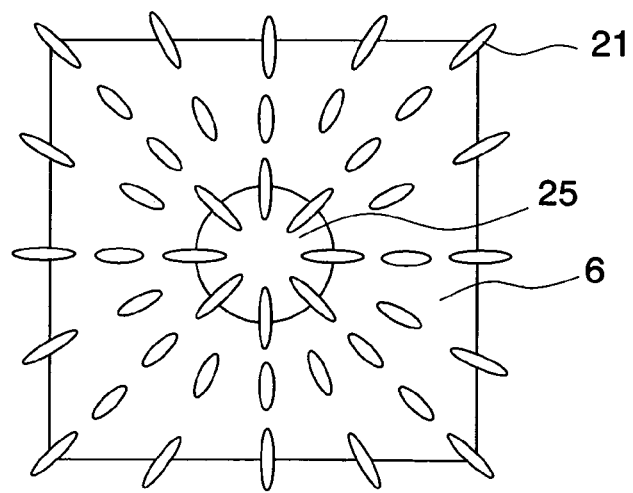
FIG. 12C schematically shows an orientation state of the liquid crystal molecules in the sub pixel area of the liquid crystal display apparatus shown in FIG. 12A when a sufficiently long time passes after the voltage is applied.

FIGS. 12A through 12C schematically show the orientation of the liquid crystal molecules in a sub pixel area in the liquid crystal display apparatus in this example. FIG. 12A shows the state when no voltage is applied. FIG. 12B shows the state immediately after a voltage is applied. FIG. 12C shows the state when a sufficiently long time passes after the voltage is applied. FIGS. 12A through 12C do not show the orientation regulating structure provided in a peripheral region of the sub pixel area (the wall structure surrounding the sub pixel area, the electrode openings, etc.).

As shown in FIG. 12A, when no voltage is applied, the liquid crystal molecules 21 are aligned generally vertically. Although the liquid crystal molecules near the inclining side surfaces of the dielectric structure 25 tend to be oriented vertically with respect to the side inclining surfaces and thus are pre-tilted, FIG. 12A does not show such a state.

When a voltage is applied, as shown in FIG. 12B, the liquid crystal molecules which are subjected to the orientation regulating force of the orientation regulating structure provided in a peripheral region of the sub pixel area (the liquid crystal molecules in the peripheral region of the sub pixel area) and the liquid crystal molecules which are subjected to the orientation regulating force of the dielectric structure 25 (the liquid crystal molecules at and near the center of the sub pixel area) are first tilted.

As time passes, the liquid crystal molecules between the orientation regulating structure in the peripheral region of the sub pixel area and the dielectric structure 25 are continuously inclined.

By providing the dielectric structure 25 at substantially the center of the sub pixel area, the orientation regulation of the liquid crystal molecules proceeds from both the dielectric structure 25 and the vicinity thereof and the orientation regulating structure in the peripheral region of the sub pixel area. This provides the effects of shortening the response time in gray scale display and increasing the recovery force against a pressure in the surface of the panel.

(Dielectric Structure)

The dielectric structure is preferably provided at a prescribed position in each area substantially surrounded by the wall structure, more specifically, at a position on a surface of the counter substrate closer to the liquid crystal layer, the position corresponding to the substantial center of each area. Here, the expression "substantially surrounded by the wall structure" refers to that a display area of a pixel area is partitioned as necessary by a regularly patterned wall structure (a continuous stepped structure, or a discontinuous stepped structure). According to the present invention, the radially inclined orientation of liquid crystal molecules is realized in each of areas obtained by such partitioning by the action of the orientation regulating structure such as the wall structure, the dielectric structure or the like.

The dielectric structure is preferably provided at substantially the center of a sub pixel area substantially surrounded by the wall structure or the like. Where the ratio of the planar size (area) Sb of the bottom of the dielectric structure with respect to the planar size (area) Sd of the sub pixel area (liquid crystal domain) is Sa(%), it is preferable that the value of Sa fulfills the relationship of $2 \leq Sa \leq 25$. When the value of Sa is smaller than the above range, the effect of stabilizing the orientation state of the liquid crystal molecules may not be obtained. When the value of Sa is larger than the above range, the ratio of the area occupied by the dielectric structure in the pixel area is too large and the effective numerical aperture is conspicuously reduced. This reduces the display luminance. In addition, in the vicinity of the inclining side surfaces of the dielectric structure, the liquid crystal molecules oriented in a direction tilted with respect to the polarization axis of the polarizing plate give a phase difference to the polarization passing through this region. As a result, light leakage occurs and the contrast ratio may be lowered. For these reasons, the size of the dielectric structure is preferably in the above-mentioned range.

In order to prevent light leakage in the vicinity of the dielectric structure, a light shielding layer may be provided on the transparent substrate 210b, if necessary. The light shielding layer can be formed by patterning a light shielding metal layer or an insulating layer having a light shielding function (for example, a black resin layer) with a known method. Provision of the light shielding layer can suppress the reduction in the contrast ratio. The light shielding layer may be provided on the active matrix substrate 210a in the area facing the dielectric structure.

It is preferable that the shape of the cross-section of the dielectric structure (the shape of the cross-section in a plane parallel to the surfaces of the substrates) is matched to the shape of a pixel area or the shape of a sub pixel area. For example, where the pixel area or the sub pixel area is rectangular, the cross-section of the dielectric structure preferably has a shape of a rectangle, a square, a rectangle with rounded corners, a square with rounded corners, a circle or an ellipse. Especially when the cross-section includes a curved surface, the liquid crystal molecules around the dielectric structure can easily exhibit a radially inclined orientation. Thus, generation of disclination can be suppressed.

Figure 13A:
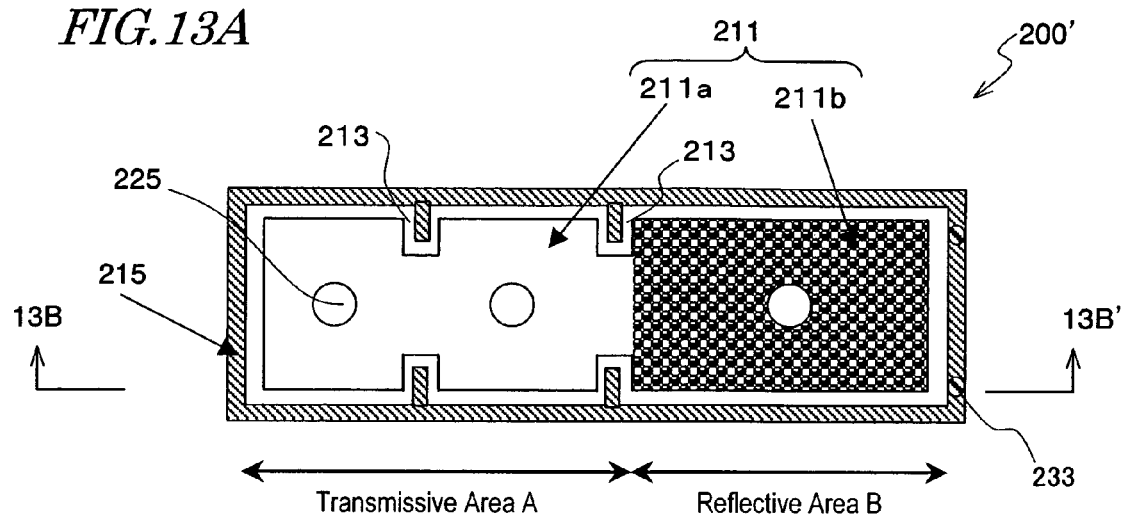
FIG. 13A is a plan view schematically illustrating a structure of a pixel area in a transflective liquid crystal display apparatus 200' in an example according to the first aspect of the present invention.
Figure 13B:
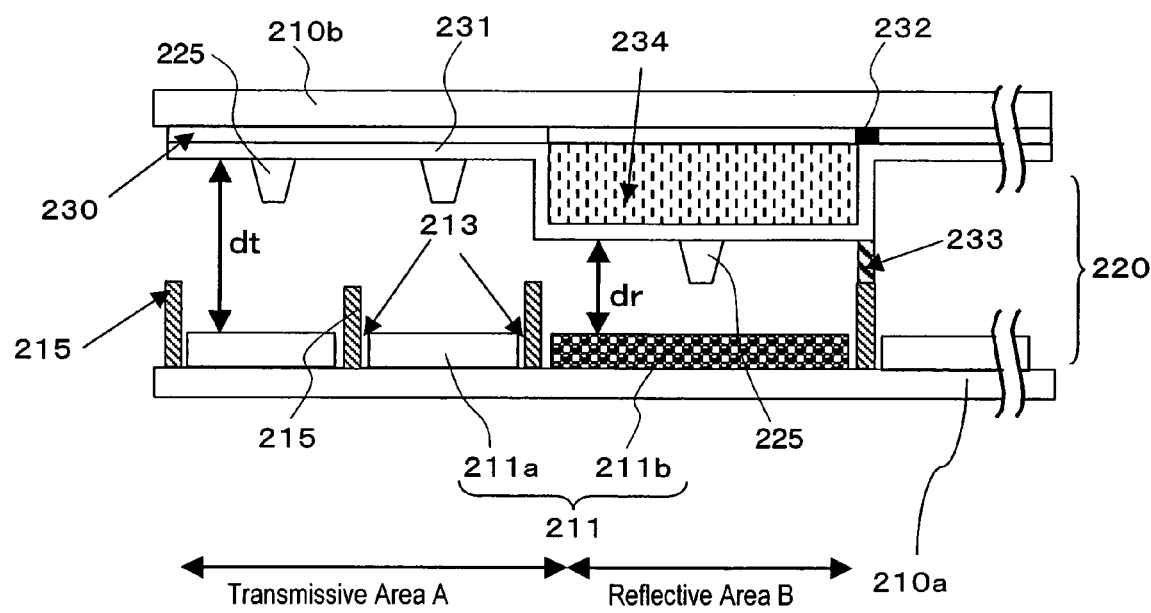
FIG. 13B is a cross-sectional view taken along line 13B-13B' in FIG. 13A.

Next, an exemplary transflective liquid crystal display apparatus 200' including the dielectric structure is shown in FIGS. 13A and 13B. FIG. 13A is a plan view thereof, and FIG. 13B is a cross-sectional view thereof taken along line 13B-13B' in FIG. 13A.

The liquid crystal display apparatus 200' in this example is obtained by providing a dielectric structure 225 at substantially the center of each of three sub pixel areas of the transflective liquid crystal display apparatus 200 in the previous example shown in FIGS. 6A and 6B. In addition, a gap is provided between the pixel electrode 211 and the wall structure 215, and the wall structure 215 is provided only in the vicinity of the pixel electrode 211 and in the cut-out portions 213 but not on the pixel electrode 211. By omitting the wall structure 215 on the pixel electrode 211, the decrease in aperture ratio and the light leakage can be reduced.

The liquid crystal display apparatus 200' in this example further stabilizes the radially inclined orientation, requires a shorter time for solving the orientation disturbance occurred when the surface of the panel is pressed, and is further superior in the response characteristics in gray scale display, as compared to the liquid crystal display apparatus 200 in the previous example.

Hereinafter, test examples 9 through 13 will be evaluated. Test examples 9 through 13 were produced fundamentally in the same manner as test example 1.

The size of a sub pixel area was 55 μm×60 μm (Sd=3300 μm$^2$). The dielectric structure 225 was formed on the second substrate 210b at a position corresponding to the substantial center of each sub pixel area. The dielectric structure 225 was formed by a photolithography process using a transparent photosensitive resin.

The bottom area Sb of the dielectric structure 225 was 78 μm$^2$ in test example 9 (truncated cone having a diameter of the bottom surface of 10 μm), 845 μm$^2$ in test example 10 (truncated cone having a diameter of the bottom surface of 32.8 μm), 480 μm$^2$ in test example 11 (truncated pyramid with a rectangular bottom surface of 20 μm×24 μm with rounded corners), 64 μm$^2$ in test example 12 (truncated cone having a diameter of the bottom surface of 9 μm), and 908 μm$^2$ in test example 13 (truncated cone having a diameter of the bottom surface of 34 μm). As in test example 1, the liquid crystal display apparatus in each test example was obtained after an optical film was provided on outer surfaces of both substrates. The structure of the optical film was the same as in test example 1.

A driving voltage was applied to each liquid crystal display apparatus (more specifically, 4 V was applied to the liquid crystal layer) to evaluate the display characteristics. For the display characteristics, the contrast (CR) value in the front direction when a voltage of 4 V was applied and the durability against pressure when the panel was pressed at a force of 1 kgf/cm$^2$ (time until an after image disappeared) were evaluated.

For the response time in gray scale display, the time required for the response from level 6 to level 7 (low voltage close to black display) in 8 levels was evaluated. Regarding the contrast value in the front direction, the design value was 300 and the lower limit was 270. Regarding the durability against pressure, the orientation recovery force after the pressurizing was evaluated. When the inferior orientation was solved (namely, the inferior orientation became visually unrecognizable) within 1 minute, it was evaluated as ◯. When the inferior orientation was solved within 5 minutes (lower limit), it was evaluated as Δ. When the orientation disturbance remained after 10 minutes, it was evaluated as X.

The evaluation results are shown in Table 2.

TABLE 2

| | Bottom area Sr (μm$^2$) | Sa (%) | Response time in gray scale (ms) | Durability against pressure | Contrast ratio in the front direction |
|---|---|---|---|---|---|
| Test example 9 | 78 | 2.2 | 18 | Δ | 340 |
| Test example 10 | 845 | 23.6 | 14.5 | ◯ | 275 |
| Test example 11 | 480 | 13.4 | 16.5 | ◯ | 300 |
| Test example 12 | 64 | 1.8 | 20 | X | 345 |
| Test example 13 | 908 | 25.4 | 14 | ◯ | 260 |

As can be appreciated from Table 2, provision of the dielectric structure shortens the response time in gray scale display and improves the durability against pressure. As can be appreciated from the result of test example 12, when Sa is less than 2%, the effect of the dielectric structure is not fully provided. As can be appreciated from the result of test example 13, an Sa exceeding 25% is not preferable since the contrast ratio in the front direction is reduced although the response time in gray scale display is shortened and the durability against pressure is increased. Considering these results comprehensively, it is preferable to provide the dielectric structure so as to fulfill the relationship of $2 \leq Sa \leq 25$. The range of Sa may be changed in accordance with the use or characteristics given priority.

A panel having the same structure as that of test example 11 was provided with a light shielding layer in order to prevent light leakage from the vicinity of the dielectric structure. It was confirmed that the contrast ratio in the front direction was increased to 380. Please note that in the step of forming a black matrix (i.e., light shielding layer) before the step of forming the dielectric structure 225 on the second substrate 210b, the light shielding layer having an area bigger than the bottom of the dielectric structure 225 is formed at a position where the dielectric structure 225 is subject to be formed, in this example.

As described above, provision of the dielectric structure 25 significantly improves the stabilization state of the radially inclined orientation of liquid crystal molecules, and realizes a shorter response time in gray scale display and a higher recovery force against pressure on the surface of the panel.

Next, a structure of a liquid crystal display apparatus according to a second aspect of the present invention will be described.

In the liquid crystal display apparatus according to the second aspect of the present invention, the openings provided in a first electrode (for example, a pixel electrode) act to fix the position of the center of the radially inclined orientation, and the cut-out portions act to define the direction in which the liquid crystal molecules in the liquid crystal domain of radially inclined orientation are tilted by the electric field. In the liquid crystal display apparatuses according to the first aspect of the present invention, the radially inclined orientation of the liquid crystal molecules in the liquid crystal domain was realized by a wall structure substantially surrounding the liquid crystal domain. In the liquid crystal display apparatus according to the second aspect of the present invention, the radially inclined orientation is realized by the opening located at substantially the center of the liquid crystal domain. In the liquid crystal display apparatus according to the second aspect of the present invention, a wall structure may be used together with the cut-out portions.

(Transmissive Liquid Crystal Display Apparatus)

Figure 14A:
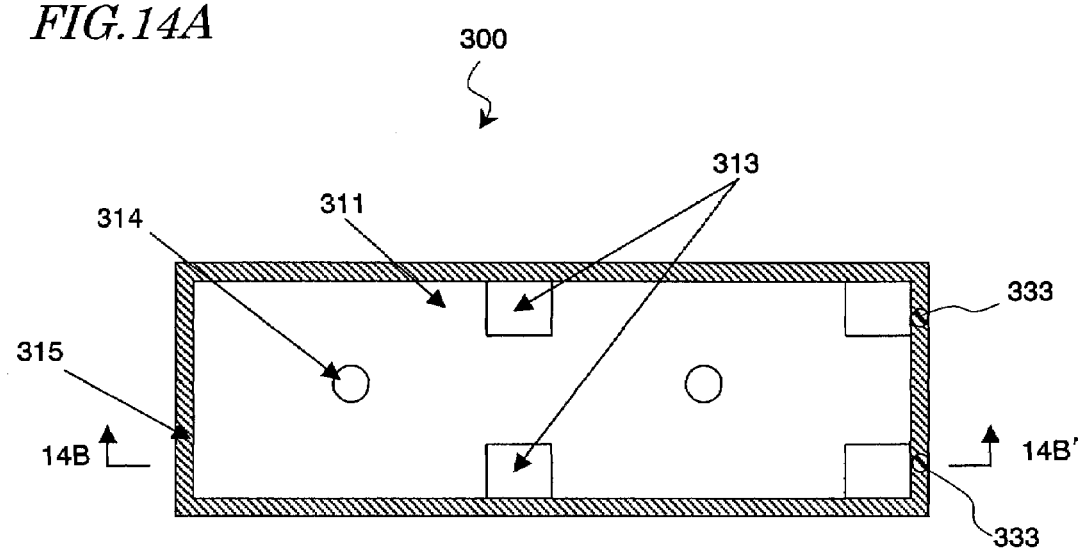
FIG. 14A is a plan view schematically illustrating a structure of a pixel area in a transmissive liquid crystal display apparatus 300 in an example according to the first aspect of the present invention.
Figure 14B:
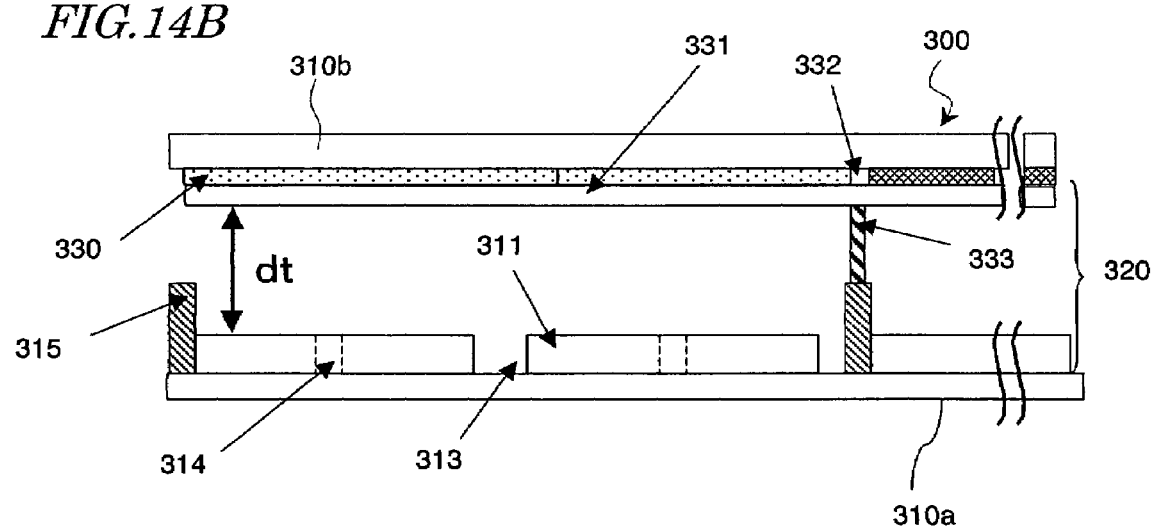
FIG. 14B is a cross-sectional view taken along line 14B-14B' in FIG. 14A.

With reference to FIGS. 14A and 14B, a transmissive liquid crystal display apparatus 300 in an example according to the second aspect of the present invention will be described. FIGS. 13A and 13B schematically show a structure of one pixel area of the liquid crystal display apparatus 300. FIG. 14A is a plan view thereof, and FIG. 14B is a cross-sectional view thereof taken along line 14B-14B' in FIG. 14A.

The liquid crystal display apparatus 300 includes a transparent substrate (for example, a glass substrate) 310a, a transparent substrate 310b provided to face the transparent substrate 310a, and a vertical orientation type liquid crystal layer 320 provided between the transparent substrates 310a and 310b. On surfaces of the transparent substrates 310a and 310b closer to the liquid crystal layer 320, a vertical alignment layer (not shown) is provided. When no voltage is applied, liquid crystal molecules in the liquid crystal layer 320 are aligned generally vertically with respect to the surfaces of the vertical alignment layers. The liquid crystal layer 320 contains a nematic liquid crystal material having a negative dielectric anisotropy and optionally contains a chiral material.

The liquid crystal display apparatus 300 includes pixel electrodes 311 provided on the transparent substrate 310a and a counter electrode 331 provided on the transparent substrate 310b. The liquid crystal layer 320 provided between the pixel electrodes 311 and the counter electrode 331 defines each of pixel areas. The pixel electrodes 311 and the counter electrode 331 are both formed of a transparent conductive layer (for example, an ITO layer). Typically, on a surface of the transparent substrate 310b closer to the liquid crystal layer 320, a color filter 330 is provided in correspondence with each pixel area and a black matrix (light shielding layer) 332 is provided between adjacent color filters 330. (A plurality of color filters may be collectively referred to as a "color filer layer 330".) On the color filters 330 and the black matrix 332, the counter electrode 331 is provided. Alternatively, the color filters 330 and the black matrix 332 may be provided on a surface of the counter electrode 331 closer to the liquid crystal layer 320.

The pixel electrode 311 includes two openings 314 and four cut-out portions 313 at prescribed positions. When a prescribed voltage is applied to the liquid crystal layer 320, two liquid crystal domains each exhibiting a radially inclined orientation of the liquid crystal molecules are formed. The central axis of the radially inclined orientation in each liquid crystal domain is formed in the opening 314 or in the vicinity thereof. As described below, each of the openings 314 formed in the pixel electrode 313 acts to fix the position of the central axis of the radially inclined orientation. The cut-out portions 313 are formed near the boundary of the domains of radially inclined orientation, and define the direction in which the liquid crystal molecules are tilted by the electric field. Thus, the cut-out portions 313 act to form the domains of radially inclined orientation. Around the openings 314 and the cut-out portions 313, an inclined electric field is formed by the voltage applied between the pixel electrode 311 and the counter electrode 331. The above-mentioned function is realized by the inclined electric field defining the direction in which the liquid crystal molecules are tilted. Here, four cut-out portions 313 are arranged in a point symmetrical manner around the opening 314 (the right opening 314 in FIGS. 14A and 14B) corresponding to the central axis of the liquid crystal domain formed in the pixel area (entirely transmissive).

By providing such cut-out portions 313, the direction in which the liquid crystal molecules are tilted when a voltage is applied is defined, and two liquid crystal domains are formed. In FIGS. 14A and 14B, no cut-out portion is provided at the left edge of the pixel electrode 311. The reason is that the same effect is provided by the cut-out portions 313 provided at the right edge of a pixel electrode (not shown) provided to the left of the pixel electrode 311 shown in FIGS. 14A and 14B. The cut-out portions, which reduces the effective numerical aperture of the pixel area, are not formed at the left edge of the pixel electrode 311 for this reason. The orientation regulating force is provided by the wall structure 315. Even though the cut-out portions are not provided at the left edge of the pixel electrode 311, stable liquid crystal domains are obtained as in the case where the cut-out portions are provided at the left edge of the pixel electrode 311. In addition, the effective numerical aperture is improved by not providing the cut-out portions.

In this example, four cut-out portions 313 are provided. At least one cut-out portion 313 provided between adjacent liquid crystal domains is sufficient. Here, for example, a lengthy cut-out portion may be provided at the center of the pixel electrode 311 and the other cut-out portions may be omitted.

The shape of the openings 314 provided for fixing the central axis of the liquid crystal domains of radially inclined orientation is preferably circular as shown in FIGS. 14A and 14B, but is not limited to being circular. In order to provide the orientation regulating force substantially equal in all the directions, the openings 314 preferably have a shape of a polygon having four or more sides and corners. The openings 314 preferably have a shape of a regular polygon. The shape of the cut-out portions 313, acting to define the direction in which the liquid crystal molecules in the liquid crystal domains of radially inclined orientation are tilted by the electric field, is set to provide the orientation regulating force which is substantially equal to the radially inclined orientation in adjacent areas. For example, the openings 314 are preferably quadrangular.

The liquid crystal display apparatus 300 includes a light shielding area and has the wall structure 315 on the transparent substrate 310a in the light shielding area. The "light shielding area" is an area which is formed around the pixel electrode 311 and is optically shielded by, for example, TFTS, gate signal lines, or source signal lines or the black matrix formed on the transparent substrate 310b. This area does not contribute to display. Therefore, the wall structure 315 formed in this area does not have any adverse influence on display.

The wall structure 315 in this example is provided as one continuous wall, but the wall structure may be divided into a plurality of walls. The wall structure 315 acts to define the boundary of the liquid crystal domains which is formed in the vicinity of the outer perimeter of the pixel area. Thus, the wall structure 315 preferably has a certain length. For example, when the wall structure 315 includes a plurality of walls, each wall preferably has a length which is greater than the length of the gap between adjacent walls.

It is preferable to provide a support 333 for defining the thickness of the liquid crystal layer 320 (also referred to as a "cell gap") in the light shielding area, since this prevents display quality from being decreased. The support 333 may be formed on either the transparent substrate 310a or 310b. The support 333 is not limited to being provided on the wall structure 315 in the light shielding area as shown in FIG. 14B. When the support 333 is provided on the wall structure 315, the sum of the height of the wall structure 315 and the height of the support 333 is set to be equal to the thickness of the liquid crystal layer 320. In the case where the support 333 is provided in an area having no wall structure 315, the height of the support 333 is set to be equal to the thickness of the liquid crystal layer 320. The support 333 can be formed, for example, by photolithography using a photosensitive resin.

When a prescribed voltage (equal to or higher than the threshold level) is applied between the pixel electrode 311 and the counter electrode 331, the liquid crystal display apparatus 300 operates as follows. Two liquid crystal domains of radially inclined orientation are respectively formed in the two openings 314 or in the vicinity thereof. The central axis of each liquid crystal domain is stabilized. The pair of cut-out portions 313 provided at the center in the longitudinal direction of the pixel electrode 311 define the direction in which the liquid crystal molecules in each liquid crystal domain are tilted by the electric field. The wall structure 315 and the cut-out portions 313 provided at the corners of the pixel electrode 311 define the direction in which the liquid crystal molecules in the liquid crystal domain in the vicinity of the outer perimeter of the pixel area are tilted by the electric field. It is considered that the orientation regulating forces provided by the openings 314, the cut-out portions 313 and the wall structure 315 cooperatively act to stabilize the orientation of the liquid crystal molecules in the liquid crystal domains.

On the surface of the transparent substrate 310a closer to the liquid crystal layer 320, an active element such as a TFT or the like and circuit elements including a gate line and a source line connected to the TFT (none of them are shown) are provided. The transparent substrate 310a, and the circuit elements, the pixel electrodes 311, the wall structure 315, the support 333, the alignment layer and the like which are provided on the transparent substrate 310a may be collectively referred to as the active matrix substrate. The transparent substrate 310b, and the color filter layer 330, the black matrix 332, the counter electrode 332, the alignment layer and the like which are provided on the transparent substrate 310b may be collectively referred to as the counter substrate or the color filter substrate.

Although not mentioned above, the liquid crystal display apparatus 300 further includes a pair of polarizing plates facing each other with the transparent substrates 310a and 310b interposed therebetween. Typically, the pair of polarizing plates are arranged such that the transmission axes thereof are perpendicular to each other. As described above, the liquid crystal display apparatus 300 may include a biaxial optically anisotropic medium layer or a uniaxial optically anisotropic medium.

(Transflective Liquid Crystal Display Apparatus)

Figure 15A:
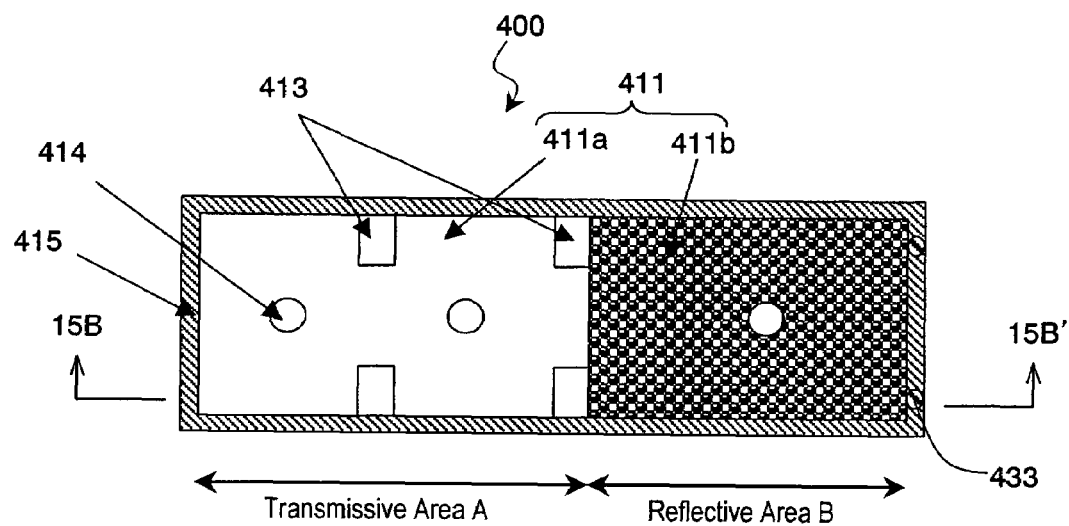
FIG. 15A is a plan view schematically illustrating a structure of a pixel area in a transflective liquid crystal display apparatus 400 in an example according to the first aspect of the present invention.
Figure 15B:
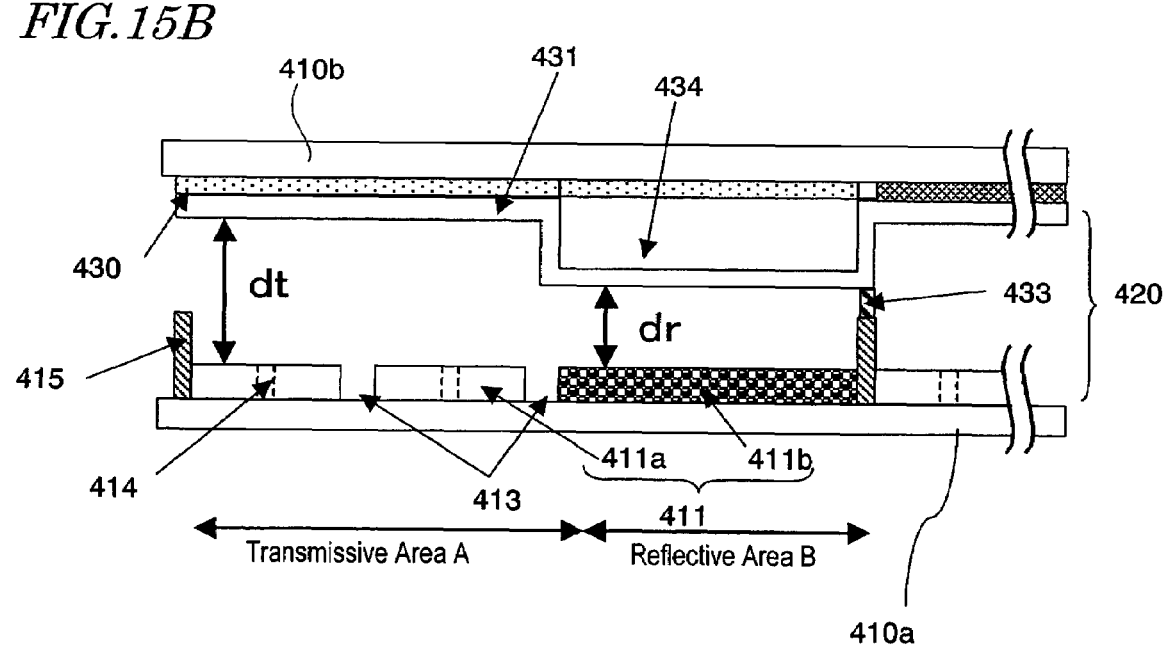
FIG. 15B is a cross-sectional view taken along line 15B-15B' in FIG. 15A.

With reference to FIGS. 15A and 15B, a transflective liquid crystal display apparatus 400 in an example according to the second aspect of the present invention will be described.

FIGS. 15A and 15B schematically show a structure of one pixel area of the liquid crystal display apparatus 400. FIG. 15A is a plan view thereof, and FIG. 15B is a cross-sectional view thereof taken along line 15B-15B' in FIG. 15A.

The liquid crystal display apparatus 400 includes a transparent substrate (for example, a glass substrate) 410a, a transparent substrate 410b provided to face the transparent substrate 410a, and a vertical orientation type liquid crystal layer 420 provided between the transparent substrates 410a and 410b. On surfaces of the transparent substrates 410a and 410b closer to the liquid crystal layer 420, a vertical alignment layer (not shown) is provided. When no voltage is applied, liquid crystal molecules in the liquid crystal layer 320 are aligned generally vertically with respect to the surfaces of the vertical alignment layers. The liquid crystal layer 320 contains a nematic liquid crystal material having a negative dielectric anisotropy and optionally contains a chiral material.

The liquid crystal display apparatus 400 includes pixel electrodes 411 provided on the transparent substrate 410a and a counter electrode 431 provided on the transparent substrate 410b. The liquid crystal layer 420 provided between the pixel electrodes 411 and the counter electrode 431 defines each of pixel areas. On the transparent substrate 410a, circuit elements including TFTs are provided as described below. The transparent substrate 410a and the elements provided thereon may be collectively referred to as the active matrix substrate 410a.

Typically, on a surface of the transparent substrate 410b closer to the liquid crystal layer 420, a color filter 430 is provided in correspondence with each pixel area and a black matrix (light shielding layer) 432 is provided between adjacent color filters 430. (A plurality of color filters may be collectively referred to as a "color filer layer 430".) On the color filters 430 and the black matrix 432, the counter electrode 431 is provided. Alternatively, the color filters 430 and the black matrix 432 may be provided on a surface of the counter electrode 431 closer to the liquid crystal layer 420. The transparent substrate 410b and the elements provided thereon may be collectively referred to as the counter substrate (or the color filter substrate) 410b.

The pixel electrodes 411 each have a transparent electrode 411a formed of a transparent conductive layer (for example, an ITO layer) and a reflective electrode 411b formed of a metal layer (for example, an Al layer, an alloy layer containing Al, or a laminate layer containing the Al layer or the alloy layer). As a result, the pixel area includes a transmissive area A defined by the transparent electrode 411a and a reflective area B defined by the reflective electrode 411b. The transmissive area A displays images in a transmissive mode and the reflective area B displays images in a reflective mode.

Each pixel electrode 411 has three openings 414 and four cut-out portions 413 at prescribed positions. When a prescribed voltage is applied to the liquid crystal layer, three liquid crystal domains each exhibiting a radially inclined orientation are formed. The central axis of the radially inclined orientation of each liquid crystal domain is formed in the respective opening 414 or in the vicinity thereof. As described below, each opening 414 formed in the pixel electrode 411 acts to fix the central axis of the respective radially inclined orientation, and the cut-out portions 413 act to define the direction in which the liquid crystal molecules in the liquid crystal domains of radially inclined orientation are tilted by the electric field. Around the openings 414 and the cut-out portions 413, an inclined electric field is formed by the voltage applied between the pixel electrode 411 and the counter electrode 413. The above-mentioned function is realized by the inclined electric field defining the direction in which the liquid crystal molecules are tilted. Here, four cut-out portions 413 are arranged in a point symmetrical manner around the opening 414 (the right opening 414 in FIGS. 15A and 15B). By providing such cut-out portions 413, the direction in which the liquid crystal molecules are tilted when a voltage is applied is defined, and three liquid crystal domains are formed. A preferable arrangement and shape of the openings 414 and the cut-out portions 413 are the same as those for the transmissive liquid crystal display apparatus 300 described above. In FIGS. 15A and 15B, two liquid crystal domains are formed in the transmissive area A and one liquid crystal domain is formed in the reflective area B. The present invention is not limited to such a structure. Each domain is preferably generally square from the viewpoints of viewing angle characteristics and orientation stability.

The liquid crystal display apparatus 400 includes a light shielding area and has a wall structure 415 on the transparent substrate 410a in the light shielding area. This area does not contribute to display. Therefore, the wall structure 415 formed in this area does not have any adverse influence on display. The wall structure 415 in this example is provided as one continuous wall, but the wall structure may be divided into a plurality of walls. The wall structure 415 acts to define the boundary of the liquid crystal domains which is formed in the vicinity of the outer perimeter of the pixel area. Thus, the wall structure 415 preferably has a certain length. For example, when the wall structure 415 includes a plurality of walls, each wall preferably has a length which is greater than the length of the gap between adjacent walls.

It is preferable to provide a support 433 for defining the thickness of the liquid crystal layer 420 (also referred to as a "cell gap") in the light shielding area (area defined by the black matrix 432 in this example), since this prevents display quality from being decreased. The support 433 may be formed on either the transparent substrate 410a or 410b. The support 433 is not limited to being provided on the wall structure 415 in the light shielding area as shown in FIG. 15B. When the support 433 is provided on the wall structure 415, the sum of the height of the wall structure 415 and the height of the support 433 is set to be equal to the thickness of the liquid crystal layer 420. In the case where the support 433 is provided in an area having no wall structure 415, the height of the support 433 is set to be equal to the thickness of the liquid crystal layer 420.

When a prescribed voltage (equal to or higher than the threshold level) is applied between the pixel electrode 411 and the counter electrode 431, the liquid crystal display apparatus 400 operates as follows. Three liquid crystal domains of radially inclined orientation are respectively formed in the three openings 414 or in the vicinity thereof. The central axis of each liquid crystal domain is stabilized. The four cut-out portions 413 in the pixel electrode 413 define the direction in which the liquid crystal molecules in each liquid crystal domain are tilted by the electric field. The wall structure 415 define the boundary of the liquid crystal domains which is formed in the vicinity of the outer perimeter of the pixel area.

Next, a preferable structure unique to the transflective liquid crystal display apparatus 400 capable of performing transmissive mode display and reflective mode display will be described.

In the transmissive mode display, light used for display passes through the liquid crystal layer 420 only once. By contrast, in the reflective mode display, light used for display passes through the liquid crystal layer 420 twice. Accordingly, as schematically shown in FIG. 15B, it is preferably to set the thickness dt of the liquid crystal layer 420 in the transmissive area A about twice as large as the thickness dr of the liquid crystal layer 420 in the reflective area B. Such setting substantially equalizes retardations given by the liquid crystal layer 420 to the light in both modes. dt=0.5 dt is most preferable. As long as the relationship of 0.3dt<dr<0.7 dr is obtained, satisfactory display is realized in both modes. In some uses, dt=dr is acceptable.

The liquid crystal display apparatus 400 includes a transparent dielectric layer 434 above the glass substrate 410b only in the reflective area B. This is provided in order to make the thickness of the liquid crystal layer 420 in the reflective area B smaller than the thickness of the liquid crystal layer 420 in the transmissive area A. With the structure of providing the transparent dielectric layer 434 on the counter substrate 410b, it is not necessary to provide a step below the reflective electrode 411b using an insulating layer or the like. This offers an advantage of simplifying the production process of the active matrix substrate 410a. In the case where the reflective electrode 411b is provided on an insulating layer which is formed for providing a step for adjusting the thickness of the liquid crystal layer 420, the following problems occur: light used for transmissive display is shielded by the reflective electrode covering the inclining surfaces (tapered surfaces) of the insulating layer; and light reflected by the reflective electrode formed on the inclining surfaces of the insulating layer is repeatedly reflected internally, and thus is not effectively used for reflective display. These problems are suppressed by the above-mentioned structure, and the utilization factor of light can be improved.

It is also preferable to form the transparent dielectric layer 434 of a layer having a light scattering function (diffusive reflection function). In this case, white display close to satisfactory paper white display can be realized without providing the reflective electrode 411b with the diffusive reflection function. White display close to satisfactory paper white display can also be realized by providing roughness to the surface of the reflective electrode 411b even without providing the transparent dielectric layer 434 with the light scatting function. However, in this case, the position of the center of the radially inclined orientation may not be stabilized when the roughness has a certain shape. By contrast, use of the transparent dielectric layer 434 having the light scattering function and the reflective electrode 411b having a flat surface offers an advantage of stabilizing the position of the center more certainly owing to the openings 414 formed in the reflective electrode 411b. In the case where the roughness is formed on the surface of the reflective electrode 411b in order to provide the reflective electrode 411b with the diffusive reflection function, it is preferable that the roughness is continuously wave-shaped so as to prevent generation of interference colors. Thus, the position of the center of the radially inclined orientation is stabilized.

Light used for display in the transmissive mode passes through the color filter layer 430 only once, whereas light used for display in the reflective mode passes through the color filter layer 430 twice. Accordingly, where the color filter layer 430 in the transmissive area A and the color filter layer 430 in the reflective area B have the same optical concentration, the color purity and/or the luminance in the reflective mode may be reduced. In order to suppress this problem, it is preferable to make the optical concentration of the color filter layer 430 in the reflective area B smaller than that of the color filter layer 430 in the transmissive area A. Herein, the optical concentration is a value characterizing the color filter layer. The optical concentration becomes smaller as the thickness of the color filter layer is made smaller. The optical concentration also becomes smaller as the concentration of the colorant added is reduced while the thickness of the color filter layer is maintained.

Figure 16:
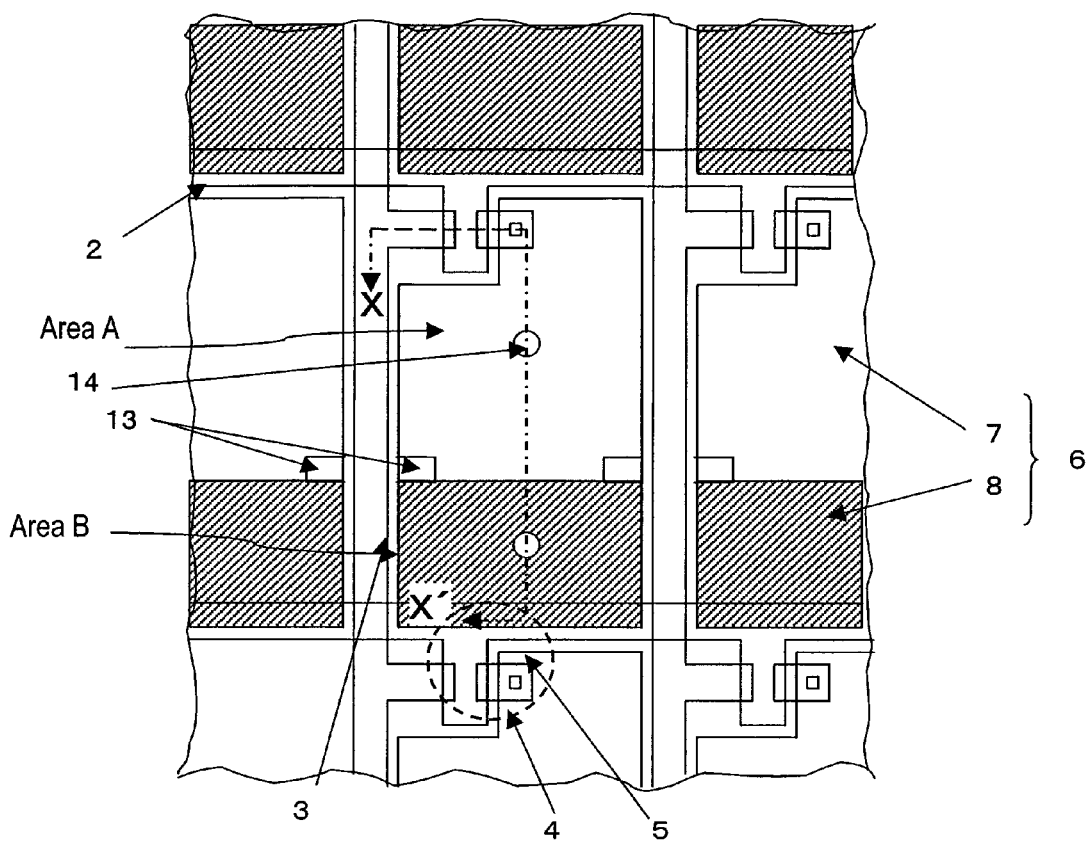
FIG. 16 is a plan view of an active matrix substrate 410a of the transflective liquid crystal display apparatus 400.
Figure 17:
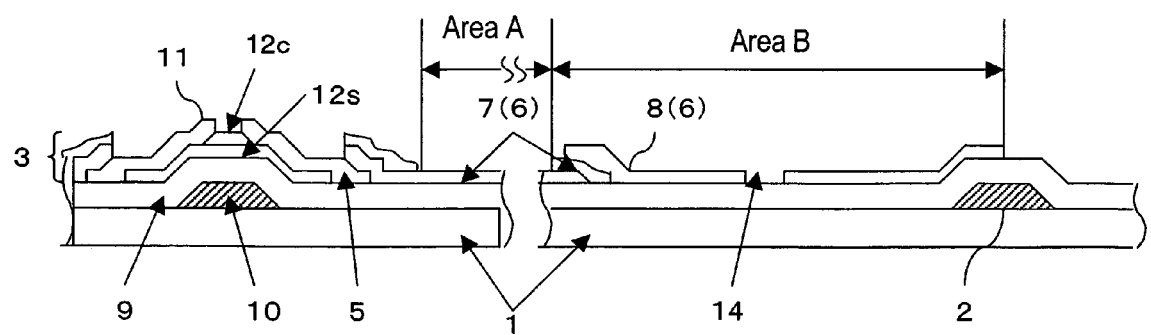
FIG. 17 is a cross-sectional view of the active matrix substrate 410a of the transflective liquid crystal display apparatus 400.

Next, with reference to FIGS. 16 and 17, an exemplary structure of an active matrix substrate preferably usable for a transflective liquid crystal display apparatus will be described. FIG. 16 is a partially enlarged view of the active matrix substrate, and FIG. 17 is a cross-sectional view taken along line X-X' in FIG. 16. The active matrix substrate shown in FIGS. 16 and 17 is different from the active matrix substrate 410a shown in FIGS. 15A and 15B in that one liquid crystal domain is formed in the transmissive area A (namely, the active matrix substrate shown in FIGS. 16 and 17 has a smaller number of openings 414 and cut-out portions 413 than the active matrix substrate 410a). The active matrix substrate shown in FIGS. 16 and 17 may be the same as the active matrix substrate 410a on other points.

The active matrix substrate shown in FIGS. 16 and 17 includes a transparent substrate 1 formed of, for example, glass. On the transparent substrate 1000, gate signal lines 2 and source signal lines 3 are provided so as to perpendicular to each other. In the vicinity of each of intersections of the gate signal lines 2 and the source signal lines 3, a TFT 4 is provided. A drain electrode 5 of the TFT 4 is connected to a pixel electrode 6.

The pixel electrode 6 includes a transparent electrode 7 formed of a transparent conductive material such as ITO or the like, and a reflective electrode 8 formed of Al or the like. The pixel electrode 6 has the cut-out portions 13 and the openings 14 at prescribed positions for controlling the orientation of the liquid crystal domain of radially inclined orientation.

The pixel electrode 6 overlaps the gate signal line below with a gate insulating layer 9 interposed therebetween, and thus a storage capacitance is formed. The TFT 4 has a structure in which the gate insulating layer 9, a semiconductor layer 12a, a channel protection layer 12c and an n-Si layer 11 (source/drain layer) are laminated on a gate electrode 10 branched from the gate signal line 2.

In this example, the TFT 4 is of a bottom gate type, but a top gate type TFT is also usable.

As described above, the liquid crystal display apparatus 400 shown in FIGS. 15A and 15B, like the liquid crystal display apparatus 300, has an effect of sufficiently stabilizing the orientation of liquid crystal molecules, with a relatively simple structure of providing an orientation regulating structure (the openings 414, the cut-out portions 413 and the wall structure 415 formed in the pixel electrode 411) for regulating the radially inclined orientation only on one substrate. By structuring the transparent dielectric layer 434 and/or the color filter layer 430 as described above, the brightness and color purity of display in the transmissive mode and the reflective mode can be improved.

(Operation Principle)

Figure 18A:
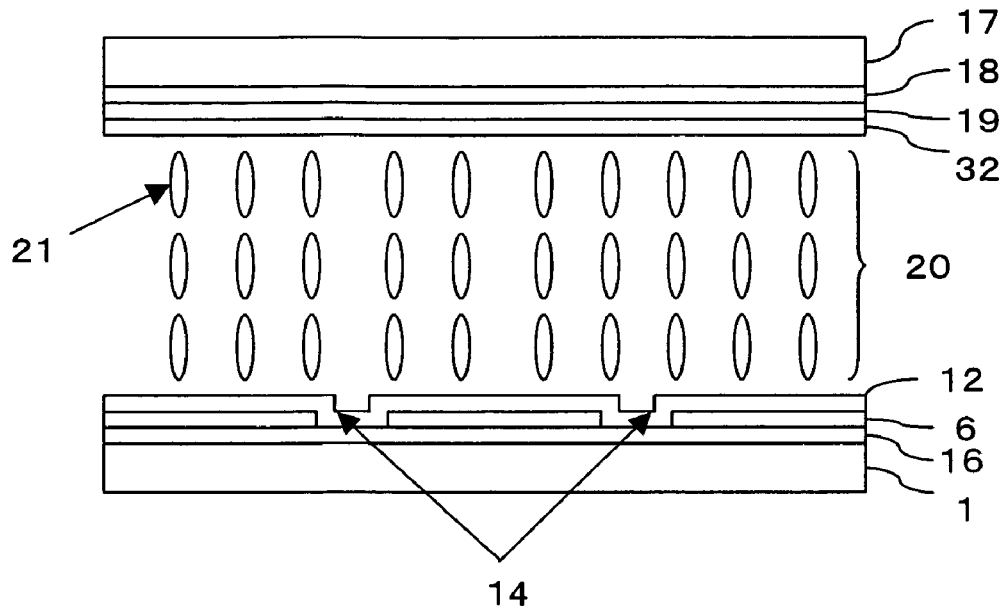
FIG. 18A schematically shows an operation principle of a liquid crystal display apparatus in an example according to the present invention when no voltage is applied.
Figure 18B:
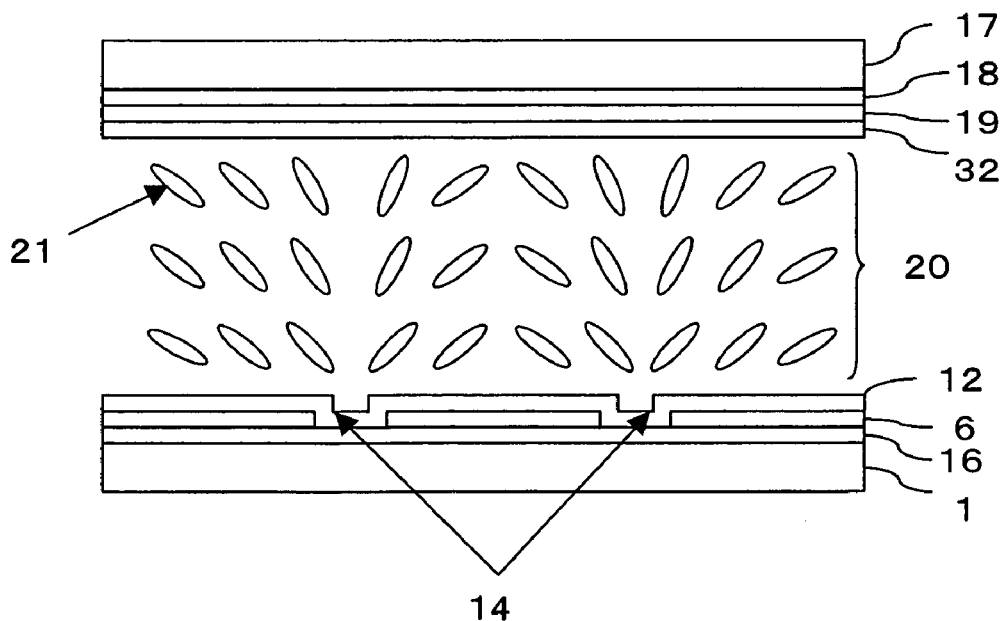
FIG. 18B schematically shows an operation principle of the liquid crystal display apparatus shown in FIG. 18A when a voltage is applied.

With reference to FIGS. 18A and 18B, the reason why the liquid crystal display apparatus according to the second aspect of the present invention having a vertical alignment type liquid crystal layer has excellently wide viewing angle characteristics will be described.

FIGS. 18A and 18B illustrate the action of the orientation regulating force provided by the openings 14 formed in the pixel electrode 6. FIG. 18A schematically shows the orientation state of the liquid crystal molecules when no voltage is applied, and FIG. 18B schematically shows the orientation state of the liquid crystal molecules when a voltage is applied. FIG. 18B shows the state of gray scale display.

The liquid crystal display apparatus shown in FIGS. 18A and 18B includes an insulating layer 16, the pixel electrode 6 having the openings 14, and an alignment layer 12 provided in this order on a transparent substrate 1. On a counter substrate 17, a color filter layer 18, a counter electrode 19 and an alignment layer 32 are provided in this order. A liquid crystal layer 20 interposed between the two substrates contains liquid crystal molecules 21 having a negative dielectric anisotropy.

As shown in FIG. 18A, when no voltage is applied, the liquid crystal molecules 21 are aligned generally vertically to the surfaces of the substrates because of the alignment regulating forces of the vertical alignment layers 12 and 32.

When a voltage is applied, as shown in FIG. 18B, the liquid crystal molecules 21 having a negative dielectric anisotropy tend to be tilted such that the longer axis thereof is vertical to electric force lines. Therefore, the direction in which the liquid crystal molecules 21 are tilted is regulated by the inclined electric field generated around the openings 14. As a result, a radially inclined orientation is formed around, for example, each opening 14 (namely, liquid crystal molecules are orientated axisymmetrically). In the domain of radially inclined orientation, the liquid crystal director is oriented omnidirectionally (in directions in the plane of the substrates). This provides superb viewing angle characteristics.

In this example, the action of the inclined electric field generated around the opening 14 is described. An inclined electric field is also generated in the vicinity of a cut-out portion formed at an edge of the pixel electrode 6, and the direction in which the liquid crystal molecules 21 are tilted by the electric field is regulated. The wall structure regulates the direction in which the liquid crystal molecules 21 are tilted by the orientation regulating force of the side surfaces (wall surfaces) thereof. Typically, the vertical alignment layer is provided so as to cover the wall structure, and therefore the liquid crystal molecules is regulated by the force to be oriented vertically to the wall surfaces.

The liquid crystal display apparatus in an example according to the second aspect of the present invention has the structure as shown in FIG. 4, like the liquid crystal display apparatus according to the first aspect of the present invention.

Figure 19:
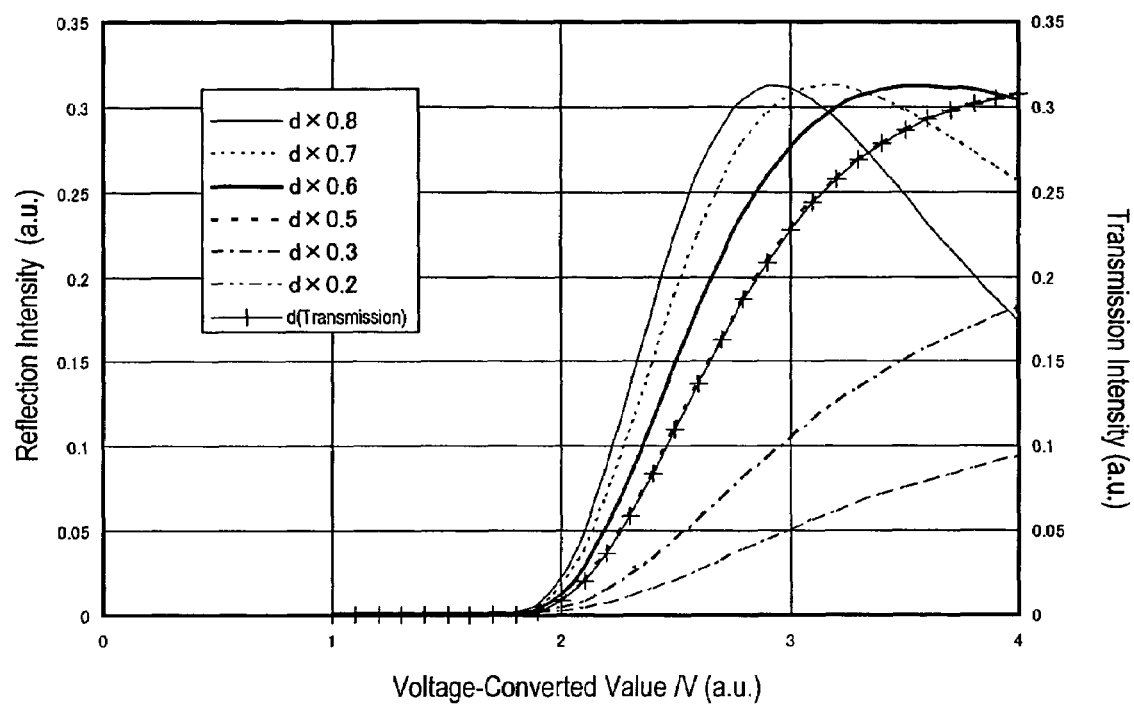
FIG. 19 is a graph illustrating the dependency of the voltage vs. reflectance (transmittance) in the transmissive area and the reflective area on the thickness of the liquid crystal layer in a liquid crystal display apparatus in an example according to the present invention.

The thickness dt of the liquid crystal layer in the transmissive area, and the thickness dr of the liquid crystal layer in the reflective area, preferably fulfill the relationship of 0.3 dt<dr<0.7 dt, as shown by FIG. 19. FIG. 19 shows the dependency of the voltage vs. reflectance (transmittance) in the transmissive area and the reflective area on the thickness of the liquid crystal layer. More preferably, dt and dr fulfill the relationship of 0.4 dt<dr<0.6 dt. When the thickness of the liquid crystal layer in the reflective area is less than the lower limit, the reflectance is 50% or less of the maximum reflectance, and thus a sufficient reflectance is not obtained. When the thickness of the liquid crystal layer in the reflective area is larger than the upper limit, the following problems occur: the voltage vs. reflectance characteristic has a maximum value at which the reflectance is maximum at a driving voltage different from the voltage for transmissive mode display; and the relative reflectance tends to significantly drop at the white display voltage which is optimum for transmissive mode display, which results in a reflectance of 50% or less of the maximum reflectance. A sufficient reflectance is not obtained. However, the optical path length in the reflective area B is twice as large as that in the transmissive area A. Therefore, when the reflective area B is designed in the same manner as the transmissive area A, the designing of the optical birefringence anisotropy (Δn) of the liquid crystal material and the cell thickness of the panel is very important.

Specific characteristics of the transflective liquid crystal display apparatus according to the second aspect of the present invention will be described.

A liquid crystal display apparatus having the structure shown in FIG. 4 was produced. As the liquid crystal cell 50, a liquid crystal cell having substantially the same structure as that of the liquid crystal display apparatus 400 shown in FIGS. 15A and 15B except for the following points was used. The transparent dielectric layer 434 did not have any light scattering function. A resin layer having a continuous wave-shaped roughness on a surface thereof was formed below the reflective electrode 411b, so as to adjust the diffusive reflection characteristics in reflective mode display.

Vertical alignment layers were produced using a known alignment layer material using a known method. No rubbing was performed. A liquid crystal material having a negative dielectric anisotropy (Δn: 0.1; Δε: −4.5) was used. The thickness dt of the liquid crystal layer in the transmissive area was 4 μm, and the thickness dr of the liquid crystal layer in the reflective area was 2.2 μm (dr=0.55 dt).

The liquid crystal display apparatus in this example had the structure including the following elements from top: polarizing plate (on the side of the observer), ¼ wave plate (phase plate 1), phase plate having a negative optical anisotropy (phase plate 2; NR plate), liquid crystal layer (interposed between the color filter substrate (above) and the active matrix substrate (below)), phase plate having a negative optical anisotropy (phase plate 3; NR plate), ¼ wave plate (phase plate 4), and polarizing plate (on the side of the backlight). The upper and lower ¼ wave plates (phase plates 1 and 4) were arranged such that the slow axes thereof were perpendicular to each other. The phase difference between the upper and lower ¼ wave plates was 140 nm. The phase difference between the phase plates having a negative optical anisotropy (phase plates 2 and 3) was 135 nm. The two polarizing plates (on the side of the observer and on the side of the backlight) were arranged such that the transmission axes thereof were perpendicular to each other.

A driving signal was applied to the liquid crystal display apparatus (more specifically, 4 V was applied to the liquid crystal layer) to evaluate the display characteristics.

The viewing angle vs. contrast characteristics in the transmissive mode display were substantially the same as those in FIG. 9. The viewing angle characteristic was substantially symmetrical in all the directions in the transmissive mode display. The area of CR>10 was satisfactory at ±80°. The contrast in the transmissive mode display was also as high as 300:1 or greater in the front direction.

The characteristics in the reflective mode display were evaluated using a spectro-colorimeter (CM2002 available from Minolta). The characteristics in the reflective mode display was about 8.5% (converted based on the numerical aperture of 100%) based on the standard diffusive plate, and the contrast ratio was 21, which is higher than that of the conventional liquid crystal display apparatuses.

A liquid crystal display apparatus having the structure shown in FIGS. 15A and 15B but without the openings, cut-out portions and the wall structure was produced. A liquid crystal panel having an ECB mode homogenous alignment was produced using a horizontal alignment layer. A liquid crystal material having a positive dielectric anisotropy (Δn: 0.07; Δε: 8.5) was used. The thickness dt of the liquid crystal layer in the transmissive area was 4.3 μm, and the thickness dr of the liquid crystal layer in the reflective area was 2.3 μm (dr=0.53 dt).

An optical film including a plurality of optical layers such as a polarizing plate, a ¼ wave plate, a phase plate and the like was provided on both outer surfaces of the liquid crystal panel to produce a liquid crystal display apparatus.

A driving signal was applied to the liquid crystal display apparatus (more specifically, 4 V was applied to the liquid crystal layer) to evaluate the display characteristics by the same evaluation method as described above.

Regarding the viewing angle characteristics in the transmissive mode display, the area of CR>10 was satisfactory at +30°. Gradient inversion was conspicuous. The contrast in the transmissive mode display was 140:1. The characteristics in the reflective mode display was about 9.3% (converted based on the numerical aperture of 100%) based on the standard diffusive plate, and the contrast ratio was 8. The displayed image blurred in white at a lower contrast than the image provided by the liquid crystal display apparatus according to the present invention.

As described above, the liquid crystal display apparatus in an example according to the second aspect of the present invention applies the vertical alignment mode to the transmissive mode display and the reflective mode display. As a result, a high contrast was obtained in both the transmissive mode display and the reflective mode display, as compared to the conventional liquid crystal display apparatus of homogenous alignment or the liquid crystal display apparatuses using conventionally known technologies. A regulating factor for regulating the orientation in the liquid crystal domain is provided only on one substrate (the active matrix substrate in this example). Owing to such a structure, the direction in which the liquid crystal molecules of the radially inclined orientation are tilted when a voltage is applied can be regulated even without performing rubbing. Liquid crystal domains of radially inclined orientation can be formed in a pixel area regularly and stably. Thus, a large viewing angle can be realized omnidirectionally.

As described above, the present invention can realize a liquid crystal display apparatus having superb display quality with a relatively simple structure. The present invention is preferably usable for transmissive liquid crystal display apparatuses and transflective liquid crystal display apparatuses (performing both a transmissive mode display and a reflective mode display). Especially, a transflective liquid crystal display apparatus is preferably usable as a display device of cellular phone or other mobile devices.

This non-provisional application claims priority under 35 USC §119(a) on patent applications Ser. No. 2003-337993 filed in Japan on Sep. 29, 2003, No. 2003-337994 filed in Japan on Sep. 29, 2003 and No. 2004-271827 filed in Japan on Sep. 17, 2004, the entire contents of which are hereby incorporated by reference.

What is claimed is:

1. A liquid crystal display apparatus, comprising:
a first substrate;
a second substrate provided so as to face the first substrate;
a vertical alignment type liquid crystal layer provided between the first substrate and the second substrate;
a plurality of pixel areas each including a first electrode provided on the first substrate, a second electrode provided on the second substrate, and the liquid crystal layer provided between the first electrode and the second electrode; and
a wall structure regularly arranged so as to be supported by at least the first substrate and so as to protrude into the liquid crystal layer;
wherein the liquid crystal layer, when being provided with at least a prescribed voltage, forms at least one liquid crystal domain exhibiting a radially inclined orientation in an area substantially surrounded by the wall structure; and
wherein the first electrode has a plurality of openings or cut-out portions at prescribed positions, and the wall structure includes a first wall portion formed in the plurality of openings or cut-out portions, and wherein a width WW of the first wall portion fulfills the relationship of 0.4 EW<WW<0.8 EW with respect to a width EW of the opening or the cut-out portion in which the first wall portion is provided.

2. A liquid crystal display apparatus according to claim 1, wherein the plurality of openings or cut-out portions each include a rectangular portion, and the wall structure includes the first wall portion provided parallel to the rectangular portion.

3. A liquid crystal display apparatus according to claim 1, wherein the plurality of openings or cut-out portions each include a rectangular portion, and the wall structure includes a second wall portion extended from the first wall portion.

4. A liquid crystal display apparatus according to claim 1, wherein the first electrode includes a transparent electrode for defining a transmissive area, and a width EW of the opening or the cut-out portion fulfills the relationship of 1.8 dt<EW<2.5 dt with respect to a thickness dt of the liquid crystal layer in the transmissive area.

5. A liquid crystal display apparatus according to claim 1, wherein the wall structure includes a third wall portion provided in an area surrounding the first electrode.

6. A liquid crystal display apparatus according to claim 1, further comprising a dielectric structure provided on a surface of the second substrate closer to the liquid crystal layer.

7. A liquid crystal display apparatus according to claim 6, wherein the dielectric structure is located at substantially the center of the at least one liquid crystal domain.

8. A liquid crystal display apparatus according to claim 6, wherein the dielectric structure is located at substantially the center of an area substantially surrounded by the wall structure.

9. A liquid crystal display apparatus according to claim 6, wherein where a planar size of the area substantially surrounded by the wall structure is Sd, a planar size of a bottom of the dielectric structure located at substantially the center of the area is Sb, and Sa=(Sb/Sd)×100, the relationship of $2 \leq Sa \leq 25$ is fulfilled.

10. A liquid crystal display apparatus according to claim 6, wherein at least a portion of the wall structure and the dielectric structure is located in a light shielding area.

11. A liquid crystal display apparatus according to claim 1, wherein the liquid crystal layer includes a plurality of areas having different thicknesses.

12. A liquid crystal display apparatus according to claim 1, wherein the first electrode includes a transparent electrode for defining a transmissive area and a reflective electrode for defining a reflective area, and a thickness dt of the liquid crystal layer in the transmissive area is larger than a thickness dr of the liquid crystal layer in the reflective area.

13. A liquid crystal display apparatus according to claim 12, wherein the openings or the cut-out portions include an opening or a cut-put portion provided between the transmissive area and the reflective area.

14. A liquid crystal display apparatus according to claim 12, wherein a height WH of the wall structure fulfills the relationship of 0.25 dt<WH<0.4 dt with respect to the thickness dt of the liquid crystal layer in the transmissive area.

15. A liquid crystal display apparatus according to claim 1, wherein at least one of the first substrate and the second substrate has a support for defining the thickness of the liquid crystal layer.

16. A liquid crystal display apparatus according to claim 1, wherein the first substrate further includes an active element provided for each of the plurality of pixel areas, and the first electrode is a pixel electrode provided for each of the plurality of pixel areas and connected to the active element.

17. A liquid crystal display apparatus according to claim 1, further comprising a pair of polarizing plates provided so as to face each other with the first substrate and the second substrate interposed therebetween, and at least one biaxial optically anisotropic medium layer provided between the first substrate and/or the second substrate and the pair of polarizing plates.

18. A liquid crystal display apparatus according to claim 1, further comprising a pair of polarizing plates provided so as to face each other with the first substrate and the second substrate interposed therebetween, and at least one uniaxial optically anisotropic medium layer provided between the first substrate and/or the second substrate and the pair of polarizing plates.

19. A liquid crystal display apparatus, comprising:
a first substrate;
a second substrate provided so as to face the first substrate;
a vertical alignment type liquid crystal layer provided between the first substrate and the second substrate;
a plurality of pixel areas each including a first electrode provided on the first substrate, a second electrode provided on the second substrate, and the liquid crystal layer provided between the first electrode and the second electrode; and
a wall structure regularly arranged so as to be supported by at least the first substrate and so as to protrude into the liquid crystal layer;
wherein the liquid crystal layer, when being provided with at least a prescribed voltage, forms at least one liquid crystal domain exhibiting a radially inclined orientation in an area substantially surrounded by the wall structure; and
wherein the first electrode has a plurality of openings or cut-out portions at prescribed positions, and the wall structure includes a first wall portion formed in the plurality of openings or cut-out portions, and wherein a width WW of the first wall portion fulfills the relationship of $0.6\ EW < WW < 0.9\ EW$ with respect to a width EW of the opening or the cut-out portion in which the first wall portion is provided.

* * * * *